United States Patent
Fukushima et al.

(10) Patent No.: US 7,944,464 B2
(45) Date of Patent: May 17, 2011

(54) THREE-DIMENSIONAL IMAGE DISPLAY DEVICE, THREE-DIMENSIONAL IMAGE DISPLAY METHOD, AND COMPUTER PROGRAM PRODUCT FOR THREE-DIMENSIONAL IMAGE DISPLAY

(75) Inventors: Rieko Fukushima, Tokyo (JP); Tatsuo Saishu, Tokyo (JP); Shunichi Numazaki, Kanagawa (JP); Yuzo Hirayama, Kanagawa (JP); Kazuki Taira, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 10/585,691

(22) PCT Filed: Apr. 26, 2006

(86) PCT No.: PCT/JP2006/309189
§ 371 (c)(1),
(2), (4) Date: Jul. 10, 2006

(87) PCT Pub. No.: WO2007/037034
PCT Pub. Date: Apr. 5, 2007

(65) Prior Publication Data
US 2009/0195642 A1 Aug. 6, 2009

(30) Foreign Application Priority Data
Sep. 29, 2005 (JP) .................................. 2005-283478

(51) Int. Cl.
*H04N 13/04* (2006.01)
(52) U.S. Cl. .................................. 348/51; 348/E13.001
(58) Field of Classification Search ............... 348/42–60
See application file for complete search history.

(56) References Cited

U.S. PATENT DOCUMENTS

| | | | | |
|---|---|---|---|---|
| 5,617,490 A | * | 4/1997 | Kume et al. | 382/275 |
| 6,064,424 A | * | 5/2000 | van Berkel et al. | 348/51 |
| 6,329,963 B1 | * | 12/2001 | Chiabrera et al. | 345/6 |
| 6,791,570 B1 | | 9/2004 | Schwerdtner et al. | |

(Continued)

FOREIGN PATENT DOCUMENTS

EP 0 791 847 A1 8/1997
(Continued)

OTHER PUBLICATIONS

Written Opinion and International Search Report issued by the European Patent Office on Sep. 7, 2006, for International Application No. PCT/JP2006/309189.

(Continued)

*Primary Examiner* — Andy S. Rao
*Assistant Examiner* — Hee-Yong Kim
(74) *Attorney, Agent, or Firm* — Finnegan, Henderson, Farabow, Garrett & Dunner, L.L.P.

(57) ABSTRACT

A three-dimensional image display device includes a two-dimensional image display screen having color filters in which each color is disposed on sub-pixels obtained by dividing one pixel in a vertical direction and same color is disposed on each column of sub-pixels; an optical plate having an exit pupil, the exit pupil being provided for making a viewing zone different for each pixel and having a longitudinal axis disposed as to be inclined from a vertical direction of the two-dimensional image display screen at a degree ($\theta$) ($\theta \neq 0$, $-45° < \theta < 45°$), the viewing zone being a region in which parallax information displayed on the two-dimensional image display screen is observed; and a viewing zone adjusting unit that adjusts the viewing zone by shifting the viewing zone in a horizontal direction of the two-dimensional image display screen by shifting the parallax information disposed on each pixel of the two-dimensional image display screen in the vertical direction by pixel.

8 Claims, 18 Drawing Sheets

U.S. PATENT DOCUMENTS

| | | | |
|---|---|---|---|
| 2002/0006213 A1* | 1/2002 | Doudnikov et al. | 382/103 |
| 2002/0011969 A1 | 1/2002 | Lipton et al. | |
| 2005/0259323 A1 | 11/2005 | Fukushima et al. | |

FOREIGN PATENT DOCUMENTS

| | | |
|---|---|---|
| EP | 1 566 683 A1 | 8/2005 |
| JP | 09-233500 | 9/1997 |
| JP | 09-236777 | 9/1997 |
| JP | 2001-506435 | 5/2001 |
| JP | 2005-258421 | 9/2005 |

OTHER PUBLICATIONS

U.S. Appl. No. 10/581,364, to Saishu et al., filed Jun. 2, 2006, entitled "Structure of Stereoscopic Image Data, Stereoscopic Image Data Recording Method, Reproducing Method, Recording Program, and Reproducing Program".

Decision to Grant a Patent-Japanese Patent Application No. 2005-283478, date of certification Apr. 22, 2010.

* cited by examiner

US 7,944,464 B2

THREE-DIMENSIONAL IMAGE DISPLAY DEVICE, THREE-DIMENSIONAL IMAGE DISPLAY METHOD, AND COMPUTER PROGRAM PRODUCT FOR THREE-DIMENSIONAL IMAGE DISPLAY

TECHNICAL FIELD

The present invention relates to a three-dimensional image display device, a method of displaying a three-dimensional image, and a computer program product for displaying a three-dimensional image, according to which a parallax information is displayed.

This application is based upon and claims the benefit of priority from the prior Japanese Patent Application No. 2005-283478, filed on Sep. 29, 2005; the entire contents of which are incorporated herein by reference.

BACKGROUND ART

A naked-eye type three-dimensional image display device, in which the parallax information is spatially cut in a horizontal direction and presented, has been known. An observer can recognize a three-dimensional image by observing the parallax information according to his/her position, further, to a position of his/her eyes.

Many of the three-dimensional image display devices are specifically structured by a combination of a flat panel display (FPD) such as a liquid crystal display (LCD) and a plasma display panel (PDP), and an optical plate represented by a lens array and a pinhole array, or the like.

In the case of the lens, a ray emitted from a point in a pixel of the FPD exits as a substantially parallel light, when the FPD is positioned substantially at a focal distance of the lens. Since a pixel has a limited size, the ray emitted from the pixel is incident on a certain range. In the case of the pinhole, the ray emitted from a pixel goes through the pinhole, whereby a direction, to which the ray exits, is limited. By making the direction to which the ray exits and the direction in which image information to be displayed on the pixel from which the ray is emitted is obtained substantially conform to each other, an appropriate image can be seen according to the position of the observer, further to the position of the eyes of the observer. Then, the image is recognized as the three-dimensional image. The lens and the pinhole are called as an exit pupil.

In the structure of such naked-eye type three-dimensional image display device, it is required to relate a plurality of pixels for displaying two-dimensional image for displaying the parallax information, that is, an elemental image, to one pixel for displaying three-dimensional image (lens and pinhole).

Since the number of pixels of the FPD is limited, there is a trade-off relation, that is, if the parallax information is increased, definition of the three-dimensional image is deteriorated, whereas if the definition of the three-dimensional image is improved, parallax number is decreased. In order to restrain the deterioration of the definition of the three-dimensional image and of the parallax number, a method to present the parallax information only in the horizontal direction, has been known. The three-dimensional image display device thus presenting the parallax information only in the horizontal direction is called as a horizontal parallax type three-dimensional image display device.

On the other hand, when only a limited number of pixels for displaying the two-dimensional image are assigned to one pixel (lens and pinhole) for displaying the three-dimensional image, parallax information can be presented only in a limited range, in other words, a range in which the three-dimensional image can be observed is limited. In order to solve such a problem, there has been a method of performing tracking of the position of the observer, thereby shifting a group of pixels for displaying the two-dimensional image assigned to the pixel for displaying three-dimensional image, namely, a method of shifting a display position of the elemental image (for example, refer to Japanese Patent Application Laid-Open No. H09-233500).

DISCLOSURE OF INVENTION

However, the horizontal parallax type three-dimensional image display device is easily affected by position change of the observer, when the exit pupil is inclined from the vertical direction of the display screen. Specifically, if the observer moves, the viewing zone in which the three-dimensional image is observed is shifted in the horizontal direction of the display screen. This problem is especially obvious when the horizontal parallax type three-dimensional image display device is set such that a display surface thereof is horizontal, that is, in the so-called flatbed display. In the flatbed display, y coordinate is affected by the position and sitting height of the observer, and is easy to change as compared to that in a vertically-set device.

Further, a positioning of the two-dimensional image display device and the optical plate is required to have a sufficient accuracy, for the positioning relates to a visual region of the three-dimensional image display device. In the horizontal parallax type devices, the parallax information is sometimes disposed by sub-pixel pitch of the FPD in order to increase the horizontal parallax number. In this case, the parallax information is shifted by one with shift by sub-pixel width (approximately 50 μm). When the exit pupil is inclined from the vertical direction, an angle of depression, that is, y-coordinate is required to be tentatively defined for the setting of the visual region. Hence, the positioning becomes more difficult.

According to one aspect of the present invention, a three-dimensional image display device includes a two-dimensional image display screen having color filters in which each color is disposed on sub-pixels obtained by dividing one pixel in a vertical direction and same color is disposed on each column of sub-pixels; an optical plate having an exit pupil, the exit pupil being provided for making a viewing zone different for each pixel and having a longitudinal axis disposed as to be inclined from a vertical direction of the two-dimensional image display screen at a degree ($\theta$) ($\theta \neq 0$, $-45° < \theta < 45°$), the viewing zone being a region in which parallax information displayed on the two-dimensional image display screen is observed; and a viewing zone adjusting unit that adjusts the viewing zone by shifting the viewing zone in a horizontal direction of the two-dimensional image display screen by shifting the parallax information disposed on each pixel of the two-dimensional image display screen in the vertical direction by pixel.

According to another aspect of the present invention, a method of displaying a three-dimensional image in a three-dimensional image display device which has a two-dimensional image display screen having a color filter in which each color is disposed on sub-pixels obtained by dividing one pixel in a vertical direction and same color is disposed on each column of sub-pixels, and an optical plate having an exit pupil, the exit pupil being provided for making a1
viewing zone different for each pixel and having a longitudinal axis disposed as to be inclined from a vertical direction of the two-dimensional image display screen at a degree (θ) (θ≠0, −45°<θ<45°), the viewing zone being a region in which parallax information displayed on the two-dimensional image display screen is observed, includes shifting the viewing zone in a horizontal direction of the two-dimensional image display screen by shifting the parallax information disposed on each pixel of the two-dimensional image display screen in the vertical direction by pixel.

A computer program product according to still another aspect of the present invention causes a computer to perform the method according to the present invention.

BEST MODE(S) FOR CARRYING OUT THE INVENTION

Hereinafter, a three-dimensional image display device, a three-dimensional image display method, and a computer program product for three-dimensional image display according to the present invention will be described in detail with reference to the drawings. The present invention is not limited to the embodiment.

Figure 1:
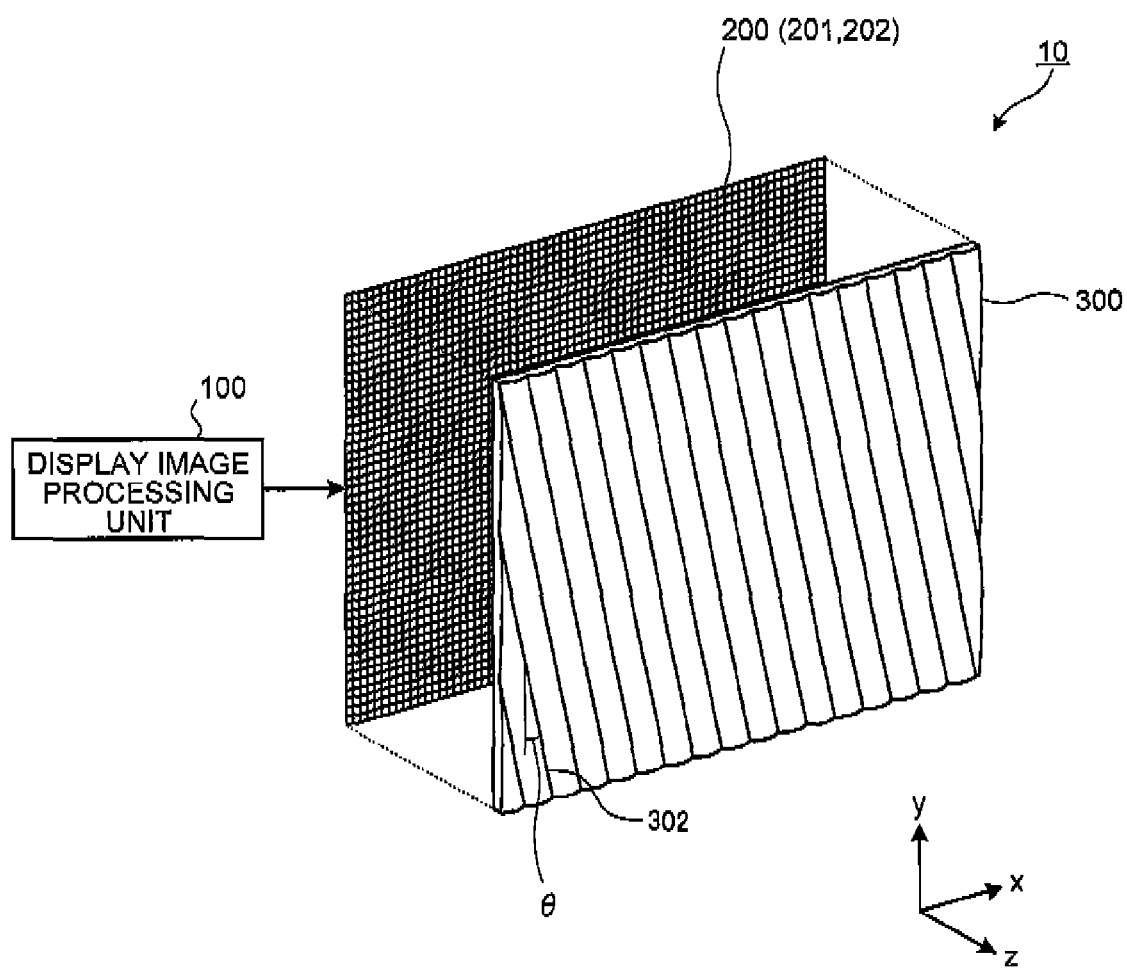
FIG. 1 shows an entire structure of a three-dimensional image display device according to a first embodiment of the present invention.

FIG. 1 is a view showing an entire structure of a three-dimensional image display device 10 according to a first embodiment. The three-dimensional image display device 10 includes a display image processing unit 100 that controls an arrangement of a parallax information, a two-dimensional image display screen 200 that displays the parallax information, and an optical plate 300 that controls a ray from the two-dimensional image display screen 200. The two-dimensional image display screen 200 includes a liquid crystal layer 201 and a color filter layer 202.

The optical plate 300 in this embodiment is a lenticular sheet. A longitudinal axis 302 of the optical plate 300 is inclined to left at arctan (¼) relative to a vertical direction of the two-dimensional image display screen 200. The two-dimensional image display screen 200 displays parallax information according to the inclination thereof.

It is only necessary that the longitudinal axis 302 of the optical plate 300 is inclined at a predetermined degree (θ≠0, −45°<θ<45°) relative to the vertical direction of the two-dimensional image display screen 200, and a degree of the inclination is not limited to that of the embodiment.

The display image processing unit 100 adjusts a viewing zone in which the parallax information displayed on the two-dimensional image display screen 200 is observed, by changing a disposing position of the parallax information displayed on the two-dimensional image display screen 200.

Meanwhile, in this embodiment, a depth direction, in which an observer side is positive, is z-direction. A horizontal direction of the two-dimensional image display screen 200, in which a right side of the observer is positive, is x-direction. A vertical direction of the two-dimensional image display screen 200, in which an upper side is positive, is y-direction.

Figure 2:
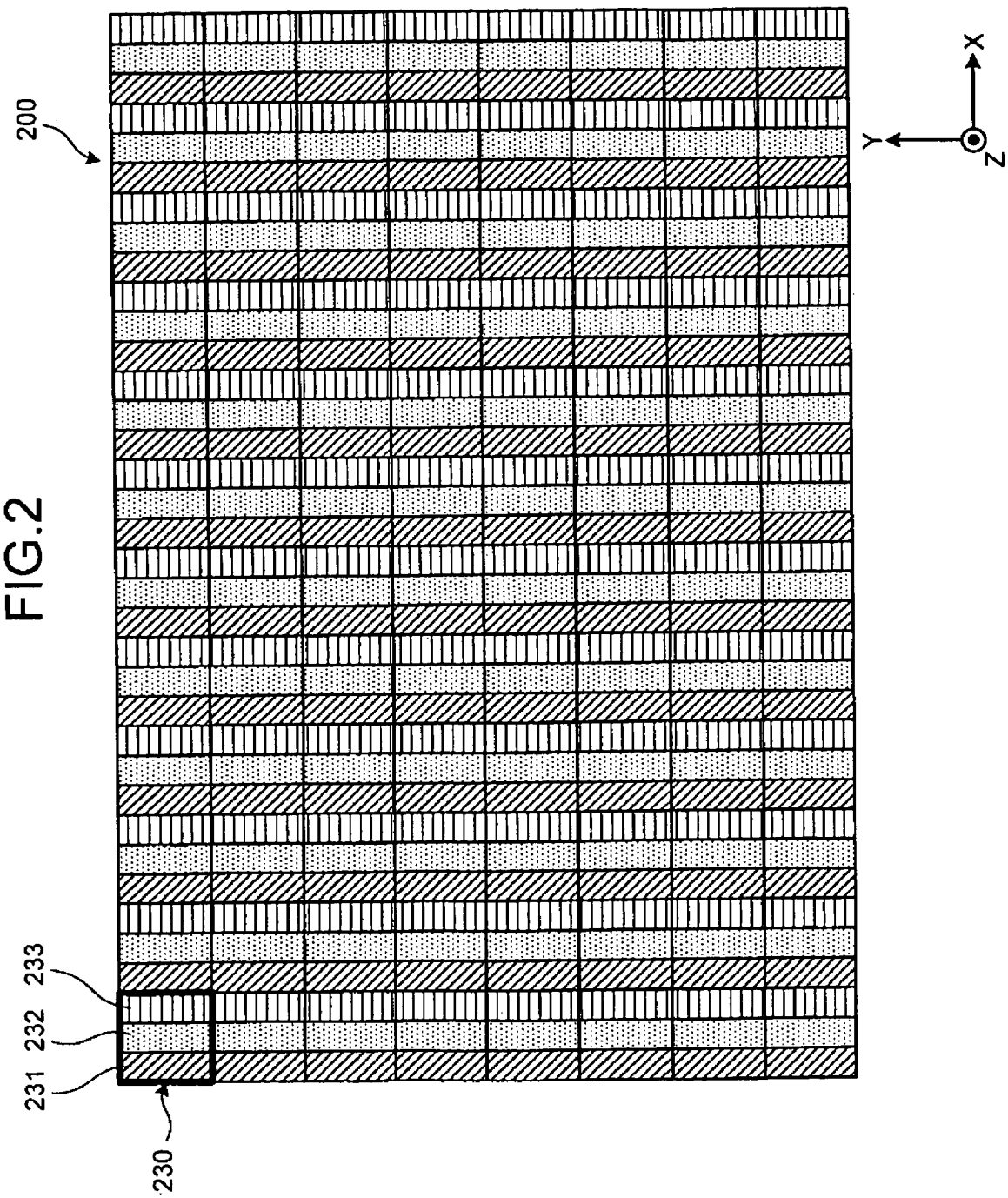
FIG. 2 shows a two-dimensional image display screen of the three-dimensional image display device.

FIG. 2 shows the two-dimensional image display screen 200, on which square pixels are disposed in array. Each of the pixels includes sub-pixels 231, 232, and 233, which are R (red), G (green), and B (blue), respectively.

Each of the sub-pixels 231, 232, and 233, which are R (red), G (green), and B (blue), respectively, is repeatedly disposed along the horizontal direction in this order. In the vertical direction, every column is composed of the sub-pixels of same color. The R (red), G (green), and B (blue) sub-pixels are realized by a proper disposition of the color filter 202 on the display screen.

Herein, the reason for inclining the longitudinal axis of the optical plate 300 at θ degree (≠0) relative to the sub-pixel column will be described. When the three sub-pixels R, G, and B, which are disposed horizontally, are treated as one pixel and the optical plate 300 is inclined, in order to improve horizontal definition, horizontal definition H and vertical definition V of a displayed three-dimensional image are represented by a following formulae (1):

$$H = \text{Horiginal} \times 3 \div N \div a$$

$$V = \text{Voriginal} \div 3 \times a \quad (1)$$

Herein, Horiginal represents the horizontal definition of the two-dimensional image display screen 200, whereas Voriginal represents the vertical definition of the two-dimensional image display screen 200. Further, N represents a parallax number and "a" represents a ratio of the vertical definition assigned to the horizontal definition as a result of the inclination of the optical plate 300.

In order to maintain the ratio of the horizontal definition Horiginal to the vertical definition Voriginal of the two-dimensional image display screen 200, also in the three-dimensional image display device 10, Horiginal and Voriginal are required to satisfy a following formula (2):

$$Horiginal:Voriginal=(Horiginal\times 3\div N\div a):(Voriginal\div 3\times a) \quad (2)$$

A formula (3) is derived from the formula (2), and N is represented by a formula (4):

$$3/(N\cdot a)=a/3 \quad (3)$$

$$N=(3/a)^2 \quad (4)$$

Figure 3:
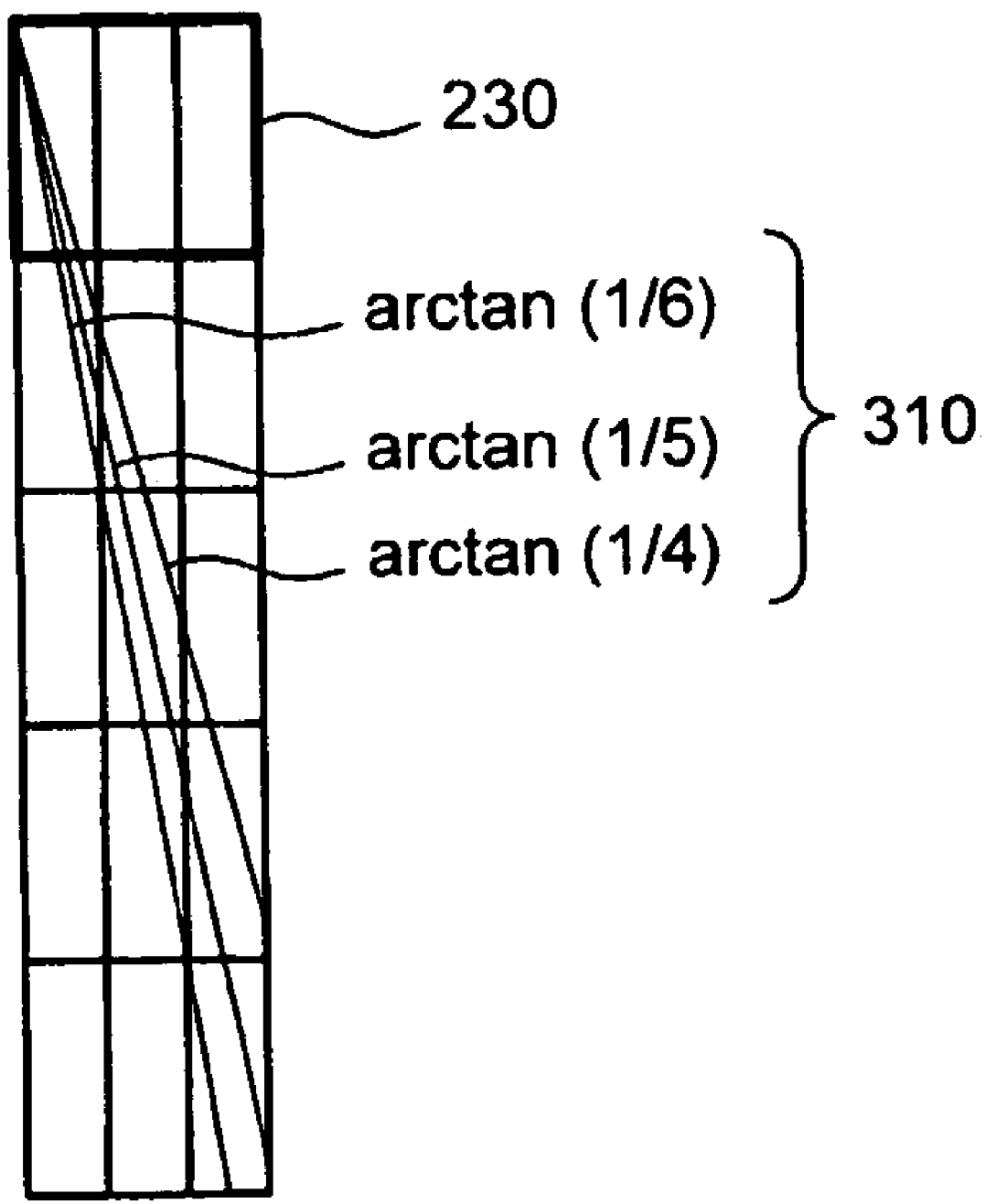
FIG. 3 shows an inclined line of an optical plate relative to a pixel of the two-dimensional image display screen of FIG. 2.

Next, a principle of the assignment of the vertical definition to the horizontal definition by the inclination of the optical plate will be described. FIG. 3 shows an inclined line 310 of the optical plate 300 relative to a pixel 230 of the two-dimensional image display screen 200. The inclined line 310 shown in FIG. 3 includes three inclined lines having different degrees θ. A region corresponding to the inclined line 310 in FIG. 3 is observed by one eye through one of exit pupils sequentially disposed in a substantially vertical direction of the optical plate 300, a focus of which conforms to the two-dimensional image display screen 200. When a position of the observer who observes the three-dimensional image displayed on the three-dimensional image display device, that is, a viewing position, is moved, the region indicated by the reference numeral 310 shifts in the horizontal direction accordingly.

When the exit pupils of the optical plate 300 are sequentially disposed in the vertical direction in the same way as the above-described pixels, as in the conventional case, a pixel, a center of which is observed through one of the exit pupils of the optical plate 300 (the center of which conforms to the region indicated by the reference numeral 310) is either all of the pixels on one column or none, so that a switching period of two states by the shift of the region indicated by the reference numeral 310 in accordance with the move of the observer, conforms to a horizontal width of the sub-pixel.

On the other hand, when the number of pixels, the center of which conforms to the region indicated by the reference numeral 310, decreases and the region indicated by the reference numeral 310 moves in accordance with the move of the observer due to the inclination of the optical plate 300, a period in which the pixel, the center of which conforms to the region, appears becomes shorter than the horizontal width of the sub-pixel. Further, when the center of the pixel is selected, there is necessarily a non-display portion, which is a boundary portion of the horizontally adjacent sub-pixels in the region indicated by the reference numeral 310.

In FIG. 3, an example in which the optical plate 300 is inclined at a rate of four, five, and six sub-pixels in the vertical direction per three sub-pixels in the horizontal direction is shown. when the optical plate 300 is inclined at the rate of four sub-pixels, five sub-pixels, and six sub-pixels in the vertical direction per three sub-pixels in the horizontal direction, a positional relationship between the region indicated by the reference numeral 310 and the pixel is identical every three sub-pixels, every four sub-pixels, and every other sub-pixels, respectively. That is, the number of the pixels having the same relative position relative to the region indicated by the reference numeral 310 (i.e., the pixels, whose observed portion is identical with each other, when observed through one of the exit pupils sequentially disposed on the substantially vertical direction) decreases to a quarter, a fifth part, and a half, respectively. On the other hand, in the horizontal direction, the pixels the center of which conforms to the region indicated by the reference numeral 310 appears in a period of a quarter the sub-pixel width, a fifth part of the sub-pixel width, and a half the sub-pixel width as compared with the period of the pixels in the optical plate which is perpendicular to the pixels. In other words, the horizontal definition increases four times, five times, and twice, respectively.

When the parallax information is divided by sub-pixel pitch, a form of the sub-pixel affects a degree of distribution of the parallax information. A liquid crystal display, for example, used as the two-dimensional image display device, is designed such that three RGB sub-pixels form one square pixel. Further, in a design for displaying numerous vertical straight lines such as characters, a color filter of vertical stripe arrangement is frequently used. Therefore, the form of the sub-pixel here is set to have a ratio of vertical length:horizontal length=3:1, as shown in FIG. 3.

When three sub-pixels dispersed in different three columns instead of three adjacent sub-pixels in the same row in the horizontal direction, are treated as one pixel, in order to improve the horizontal definition in the three-dimensional image display device, inclination θ of the optical plate is defined by a formula (5):

$$\theta=\arctan(1/n) \quad (5)$$

In the formula (5), n is an optional integer. The period, in which the pixel the center of which conforms to the region indicated by the reference numeral 310 appears, becomes 1/n of the sub-pixel width. Thereby, the horizontal definition per sub-pixel improves by n times, and three RGB sub-pixels adjacent to each other in the horizontal direction, the centers of which conform to the region indicated by the reference numeral 310 by the 1/n period (which do not conform in the vertical direction), form one pixel (triplet). Therefore, a ratio "a" of the vertical definition assigned to the horizontal definition is given by a formula (6):

$$a=3/n \quad (6)$$

In other words, when the three-dimensional image is displayed, an observable positions of the RGB sub-pixels of the triplet are subtly shifted (the centers of the three RGP sub-pixels and the region indicated by the reference numeral 310 do not conform one another at the same moment). Actually, even in a state in which the region indicated by the reference numeral 310 and the centers of the pixels do not conform, a part of the pixels is visually recognized through the exit pupil, so that a region in which the substantially conformed RGB sub-pixels are seen at the same moment, exists. Therefore, in the case of FIG. 3, θ=arctan (¼), arctan (⅕), and arctan (⅙), and the ratio "a" of the vertical definition assigned to the horizontal definition becomes a=¾, ⅗ and ½, respectively.

Therefore, by satisfying the relationship between n and N so as to satisfy the above-described formula (4), as well as making the optical plate incline according to the formula (5), deterioration ratios of the definition in the horizontal and vertical directions can be conformed to each other. That is, N and n are designed so as to satisfy a following formula (7):

$$N=n^2 \quad (7)$$

Figure 4:
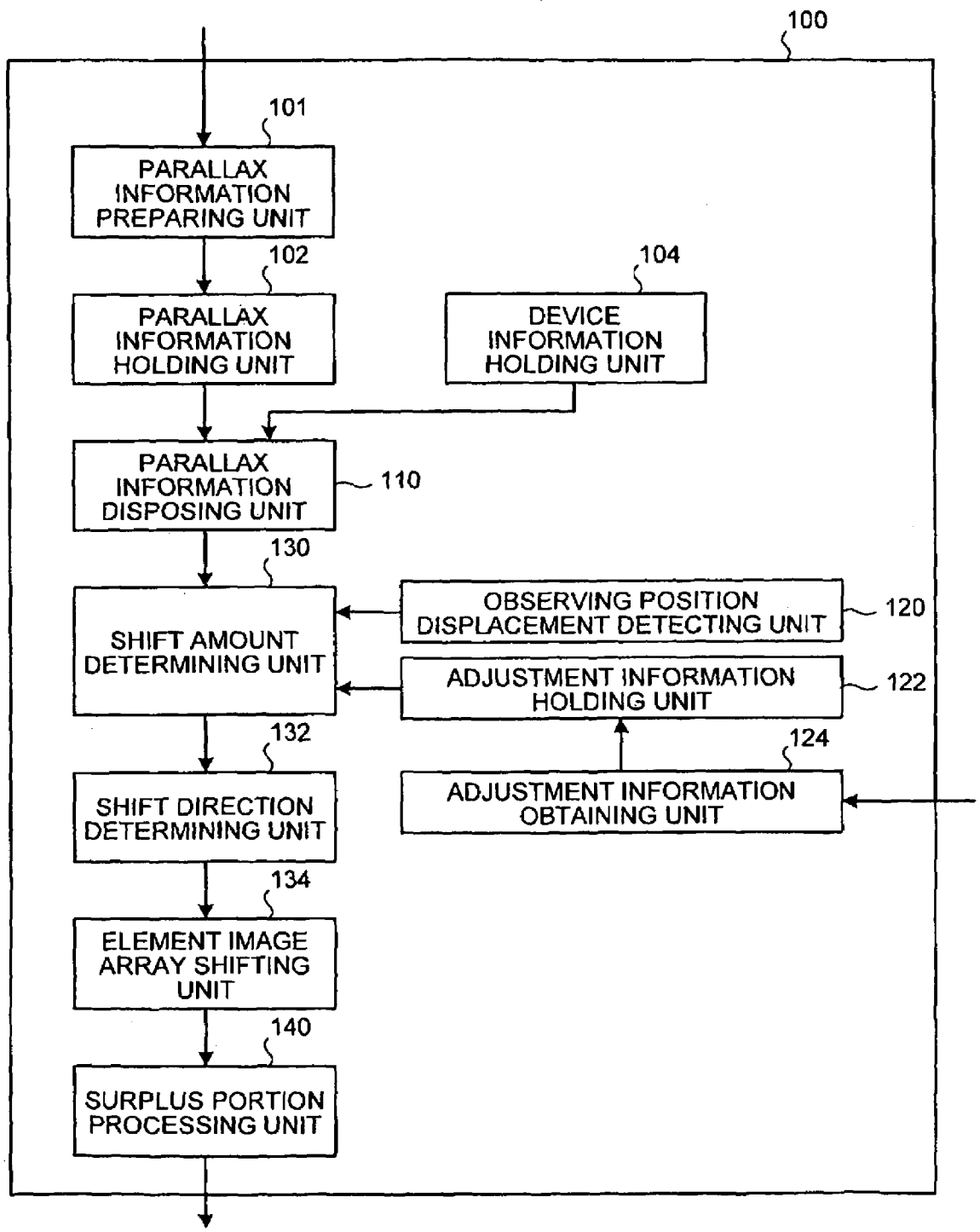
FIG. 4 is a block diagram showing a functional structure of a display image processing unit shown in FIG. 1.

FIG. 4 is a block diagram of the functional structure of the display image processing unit 100. The display image processing unit 100 includes a parallax information preparing unit 101, a parallax information holding unit 102, a device information holding unit 104, a parallax information disposing unit 110, a viewing position displacement detecting unit 120, an adjustment information holding unit 122, an adjustment information obtaining unit 124, a shift amount determining unit 130, a shift direction determining unit 132, an elemental image array shifting unit 134, and a surplus portion processing unit 140.

The parallax information preparing unit 101 prepares parallax information. Specifically, the parallax information preparing unit 101 prepares the parallax information, a size of which is larger than a screen size of the two-dimensional image display screen 200. The parallax information holding unit 102 holds the parallax information prepared by the parallax information preparing unit 101. The device information holding unit 104 holds device information. As used herein, the device information is intended to mean information about the two-dimensional image display screen 200 and the optical plate 300, and specifically, is information about the screen size, a color alignment of the sub-pixels, and the like.

The parallax information disposing unit 110 disposes the parallax information held by the parallax information holding unit 102 on each of the pixels on the two-dimensional image display screen 200. At this moment, the parallax information disposing unit 110 determines the disposing position of each of the parallax information, based on the device information held by the device information holding unit 104.

Figure 5:
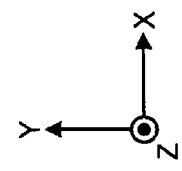
FIG. 5 shows an arrangement of parallax information disposed by a device information holding unit shown in FIG. 4.

FIG. 5 shows parallax information 400 disposed according to the device information held by the device information holding unit 104. The parallax information shown in FIG. 4 includes sixteen parallax informations in total from a first parallax information to a sixteenth parallax information. Numerals represented in each of the pixels indicate the number of the parallax information.

As shown in FIG. 4, the parallax informations having a same reference numeral are disposed on positions corresponding to an inclination degree (θ) of the longitudinal axis 302 of the optical plate 300. For example, the first parallax informations are disposed along an inclined line 312 inclined at the inclination degree θ. Further, the fourth parallax informations are disposed along an inclined line 314 inclined at the inclination degree θ.

Figure 6:
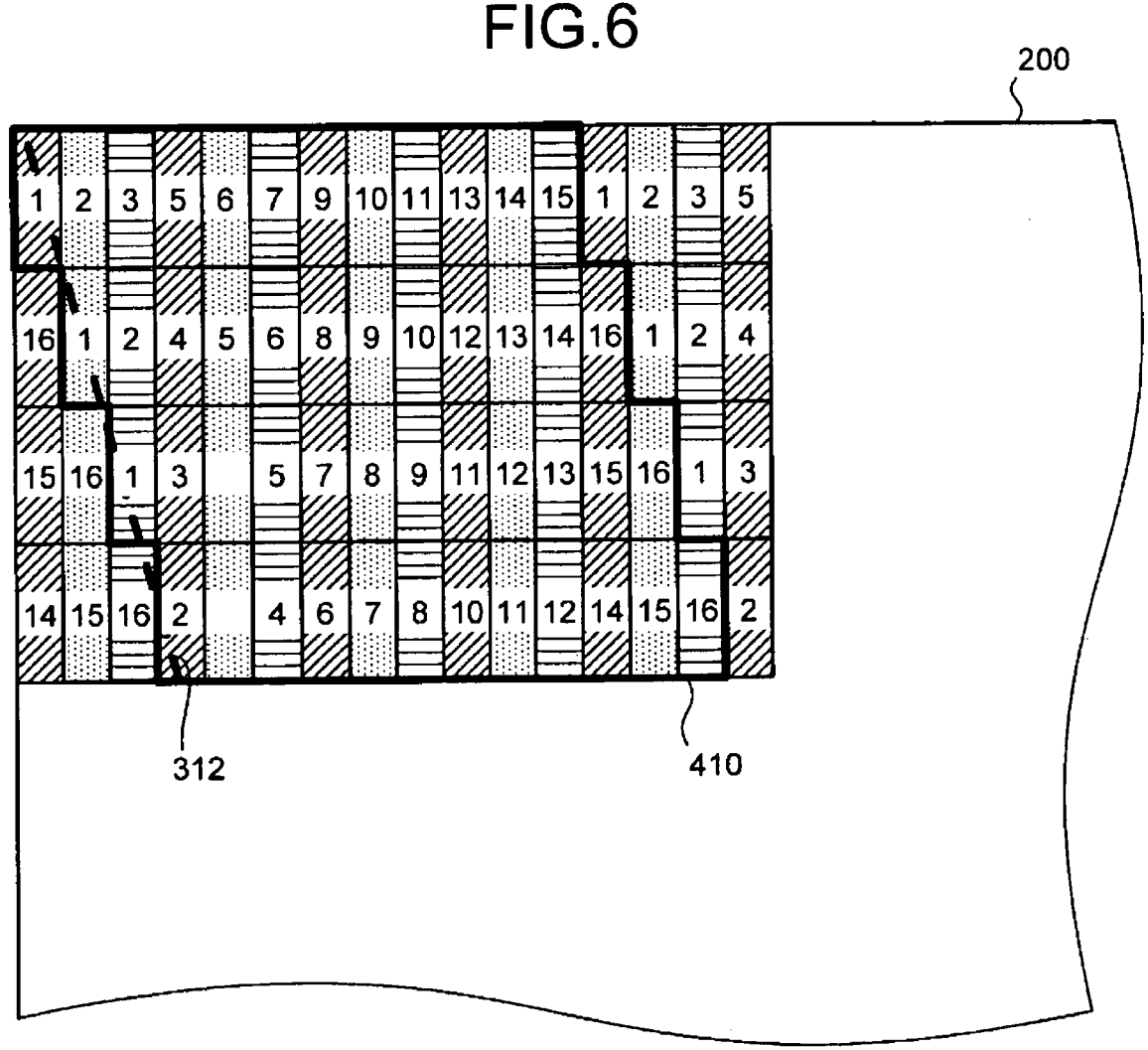
FIG. 6 is an enlarged view of one elemental image in the parallax information shown in FIG. 5.

FIG. 6 is an enlarged view showing one elemental image 410 of the parallax information 400 shown in FIG. 5. The elemental image 410 is an assembly of plural sub-pixels for displaying the parallax information corresponding to one pixel for displaying the three-dimensional image. The elemental image 410 of the first embodiment includes fifteen pixels along the horizontal direction and four pixels along the vertical direction. Further, a boundary position along the vertical direction is shifted to right by one sub-pixel as the boundary goes downwards in the vertical direction, and the elemental image 410 is a substantially parallelogram-shape.

The viewing position displacement detecting unit 120 detects displacement between the viewing position, which is a position of the observer supposed in the three-dimensional image display device 10 in advance and an actual position of the observer, that is, viewing position displacement. Further the viewing position displacement detecting unit 120 detects a degree of the viewing position displacement.

Specifically, the viewing position displacement detecting unit 120 detects an x-coordinate of a position of the head of the observer by image recognition, and performs tracking. Further, when thus obtained x-coordinate does not conform to the x-coordinate of the assumed viewing position, the viewing position displacement detecting unit 120 detects this as the position displacement. Further, the viewing position displacement detecting unit 120 detects the displacement as a viewing position displacement amount in the x-direction. Further, the viewing position displacement detecting unit 120 also detects the viewing position displacement and the viewing position displacement amount in the y-direction.

Meanwhile, when the three-dimensional image display device 10 is set vertically, the viewing position displacement in the y-direction does not matter. Thus, in this case, only the viewing position displacement and the viewing position displacement amount in the x-direction may be detected. Further, when the three-dimensional image display device 10 is a flatbed display, only the viewing position displacement and the viewing position displacement amount in the y-direction may be detected.

The adjustment information holding unit 122 holds adjustment information. The adjustment information is, for example, an optical plate position displacement amount indicating a degree of the displacement of a set degree of the optical plate 300 during the use of the three-dimensional image display device 10, and of an attaching position, generated when the optical plate 300 is attached to the two-dimensional image display screen 200. The adjustment information obtaining unit 124 obtains the adjustment information input by a user, and makes the adjustment information holding unit 122 hold the same.

The three-dimensional display device 10 according to the first embodiment can shift the viewing zone in the horizontal direction of the two-dimensional image display screen 200 according to the viewing position displacement and the adjustment information, by adjusting the disposing position of the parallax information. Hereinafter, the function and structure for this will be described.

Figure 7A:
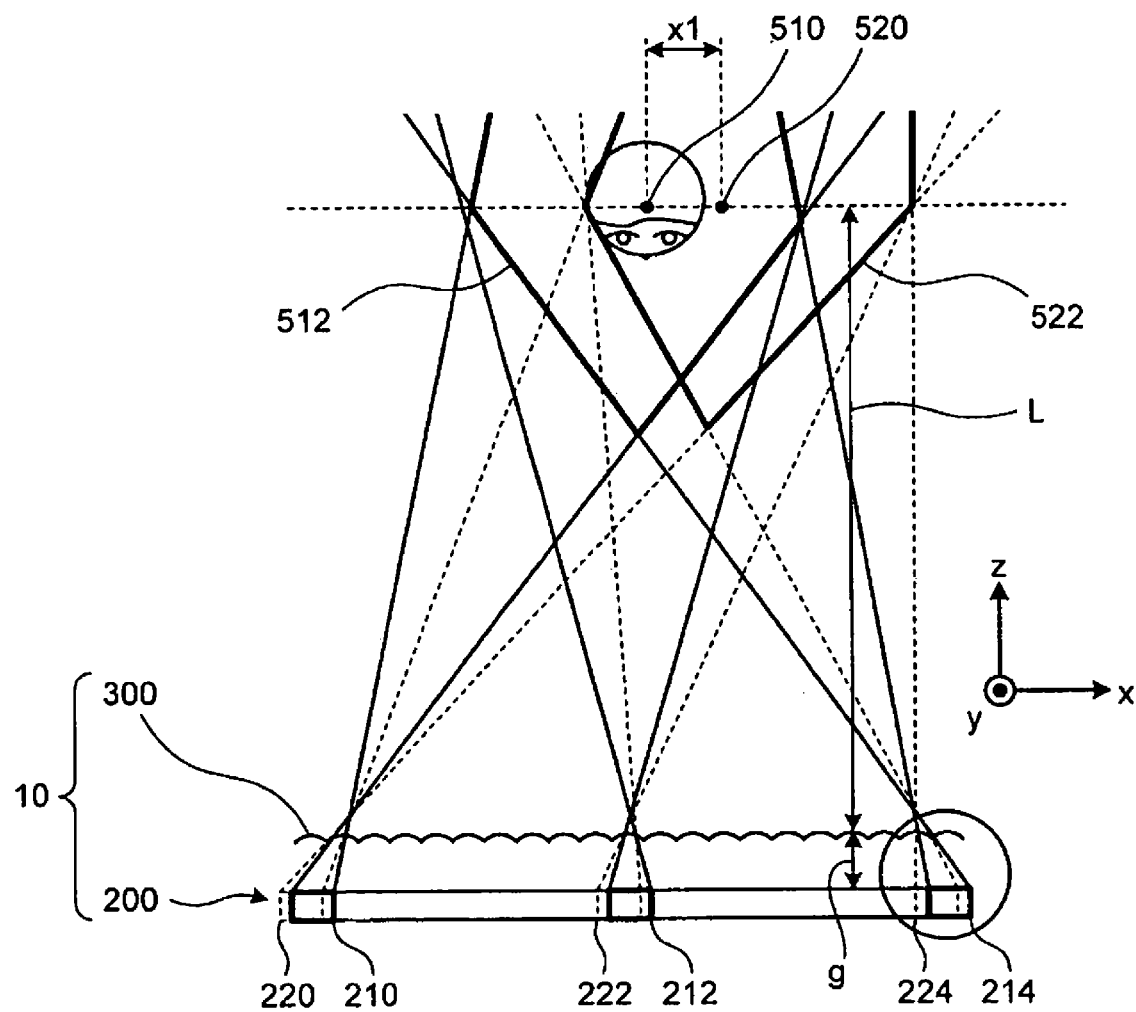
FIGS. 7A and 7B schematically show a relationship between a disposing position of the elemental image and a viewing zone.
Figure 7B:
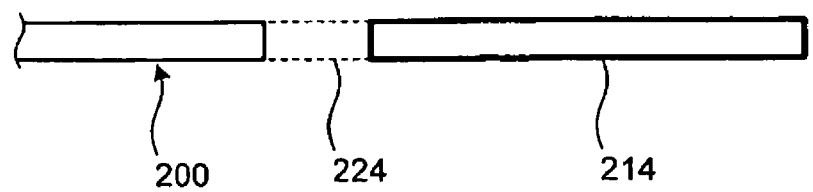

The shift amount determining unit 130 determines an amount of shifting the elemental image array, based on the viewing position displacement amount detected by the viewing position displacement detecting unit 120, and the adjustment information held by the adjustment information holding unit 122. Herein, a process of the shift amount determining unit 130 is described in detail, with reference to FIGS. 7A and 7B. FIGS. 7A and 7B illustrate a relationship between the disposing position of the elemental image array and the viewing zone.

For example, the region in which the elemental image arrays disposed on the disposing positions 210, 212, and 214 are observed is a viewing zone 512. Further, the region in which the elemental image arrays disposed on the disposing positions 220, 222, and 224, which moved in the z-direction from the disposing positions 210, 212, and 214, respectively, are observed is a viewing zone 522.

That is, when the position of the head of the observer moves from a position 510 to a position 520, the viewing zone can be turned to a direction of the observer while holding a vision of the three-dimensional image, by shifting the disposing position of the elemental image array in the x-direction according to a move amount of the observer, while maintaining disposition of each parallax information in the elemental image arrays.

More specifically, when a gap between the two-dimensional image display screen 200 and the optical plate 300 is represented by "g" and a visual distance of the observer is represented by "L," a shift amount (xe) of the elemental image array for making the viewing zone follow the observer who moved by +x1 in the x-direction is represented by a formula (8):

$$xe = -(g/L) \times x1 \qquad (8)$$

In other words, it is only necessary that the elemental image array is shifted by the shift amount (xe) in the x-direction. The shift amount determining unit 130 determines the shift amount (xe) from the formula (8) by using the position displacement amount detected by the viewing position displacement detecting unit 120, that is, an amount x1.

Figure 8:
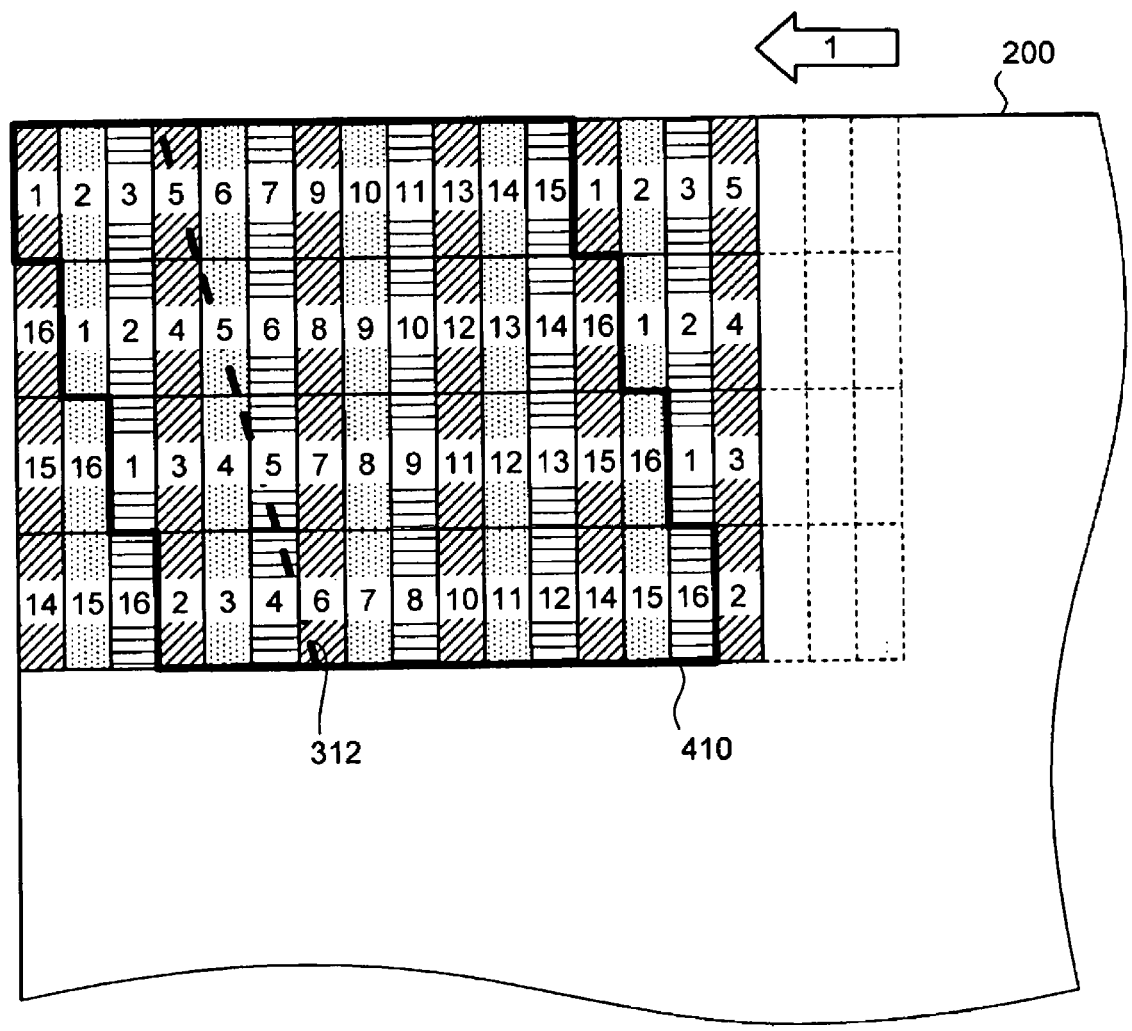
FIG. 8 shows shifting of the elemental image array in the horizontal direction.

The shift direction determining unit 132 determines a direction to which the elemental image array is shifted, based on the shift amount determined by the shift amount determining unit 130. Herein, a process of the shift direction determining unit 132 is described in detail, with reference to FIG. 8. FIG. 8 shows shifting of the elemental image array in the horizontal direction. Since the image information can be treated only by pixel (triplet), which is a minimum unit of the shift, when shifting the elemental image array in the horizontal direction.

For example, suppose that the elemental image is mapped on the two-dimensional image display screen 200, as shown in FIG. 5. Further, sub-pixel pitch of the two-dimensional image display screen 200 is set to xsp. The displacement degree (θ) of the optical plate 300 relative to the vertical direction of an edge line of a lens is defined by a formula (9):

$$\theta = a\tan(1/n) \quad (9)$$

where n is an optional integer.

Under the above-described condition, an interval xp in which the parallax information is presented with the visual distance (L) is represented by a formula (10):

$$xp = xsp \times 3/n \times L/g \quad (10)$$

The minimum value of the shift amount xs of a visual region, when the elemental image is shifted by pixel is represented by a formula (11):

$$xs = xsp \times 3 \times L/g = xp \times n \quad (11)$$

Since n is an optional integer, it is found from the formula (11) that the elemental image array can be shifted only by unit larger than the interval xp unit in which the parallax information is presented.

For example, when a WUXGA panel of 15.4 inches is used, the sub-pixel pitch xsp is set to 57.5 μm, g=1.334 mm, and L=400 mm, and mapping of the elemental image 410 is as shown in FIG. 6, the interval xp in which the parallax information is presented is 12.93 mm, from the formula (10).

On the other hand, the shift amount of the visual region is 51.72 mm at the minimum, which is larger than the interval xp, when the elemental image 410 is shifted in the horizontal direction by pixel pitch, according to the formula (11). In other words, when the observer moves in the x-direction, the visual region follows the observer after moving by approximately 5 cm in the horizontal direction, so that it is recognized as flipping.

By shifting the elemental image array by pixel in the vertical direction of the two-dimensional image display screen 200, a similar shift of the visual region as the shift by one sub-pixel in the horizontal direction becomes possible. Hereinafter, the shift in the vertical direction will be described with reference to FIGS. 9 to 12.

Figure 9:
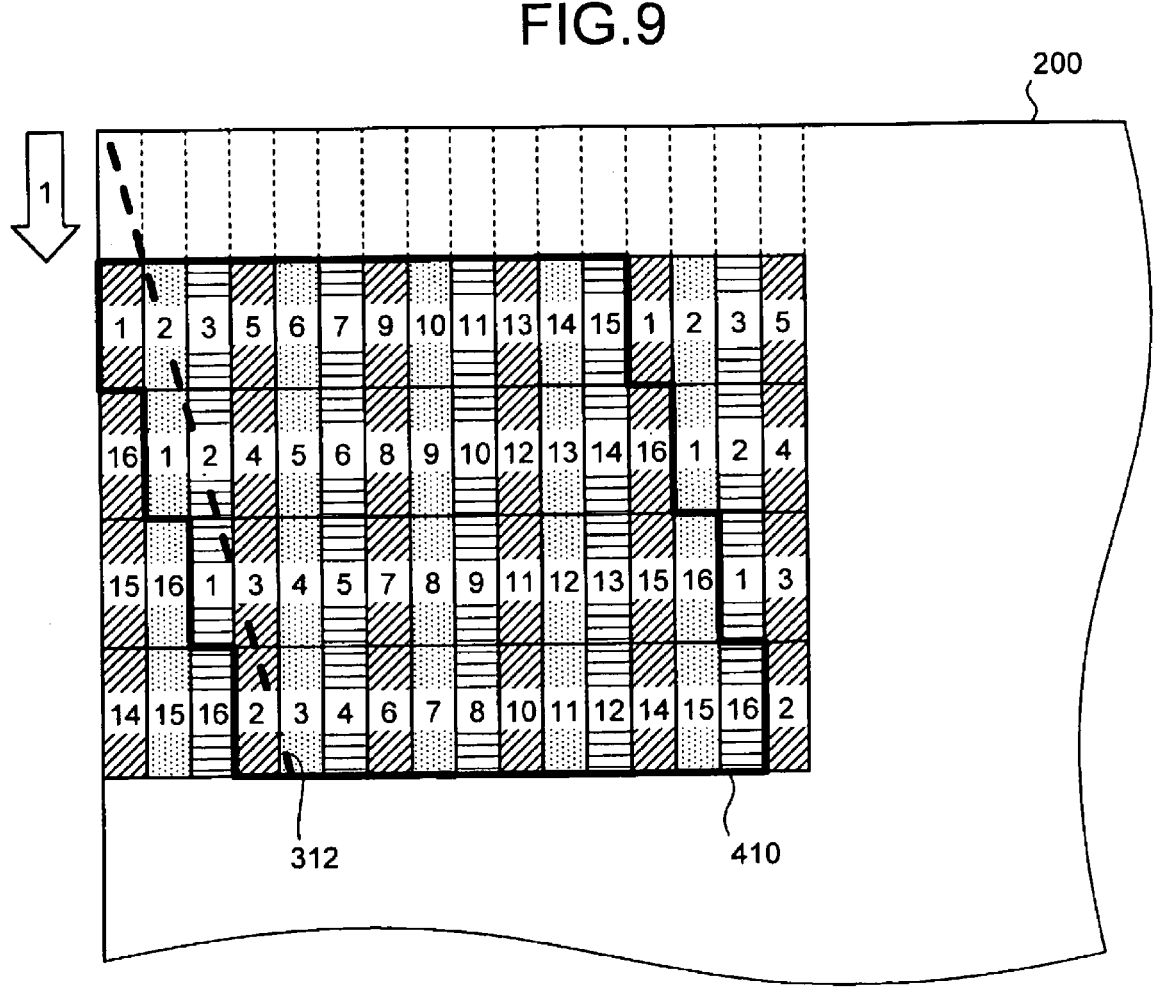
FIG. 9 shows a result of shifting of the elemental image array shown in FIG. 6 by one pixel in the vertical direction.

FIG. 9 shows a result of shifting of the elemental image array shown in FIG. 6 by one pixel in the vertical direction. In FIG. 6, the first parallax informations are disposed on the inclined line 312. On the other hand, after the array is shifted by one pixel in the vertical direction, as shown in FIG. 9, the second parallax informations are disposed on the inclined line 312. In brief, by shifting the elemental image array by one pixel in the vertical direction, a disposition similar to that in which the elemental image array is shifted by one parallax information in the horizontal direction is achieved.

Figure 10:
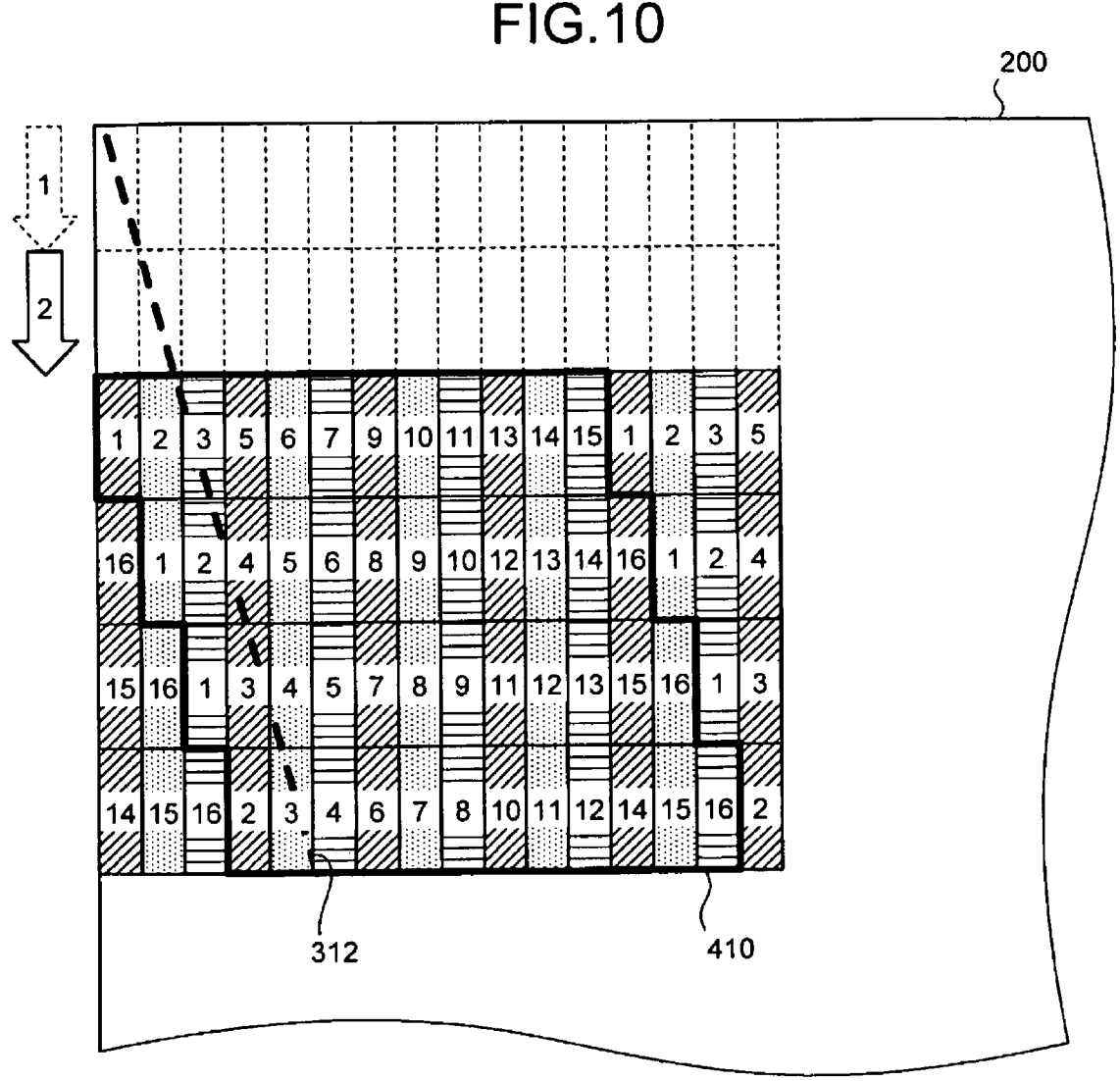
FIG. 10 shows a result of further shifting of the elemental image array shown in FIG. 9 by one pixel in the vertical direction.

FIG. 10 shows a result of further shifting of the elemental image array shown in FIG. 9 by one pixel in the vertical direction. In other words, FIG. 10 shows a result of shifting of the elemental image array shown in FIG. 6 by two pixels. In FIG. 10, the third parallax informations are disposed on the inclined line 312.

Figure 11:
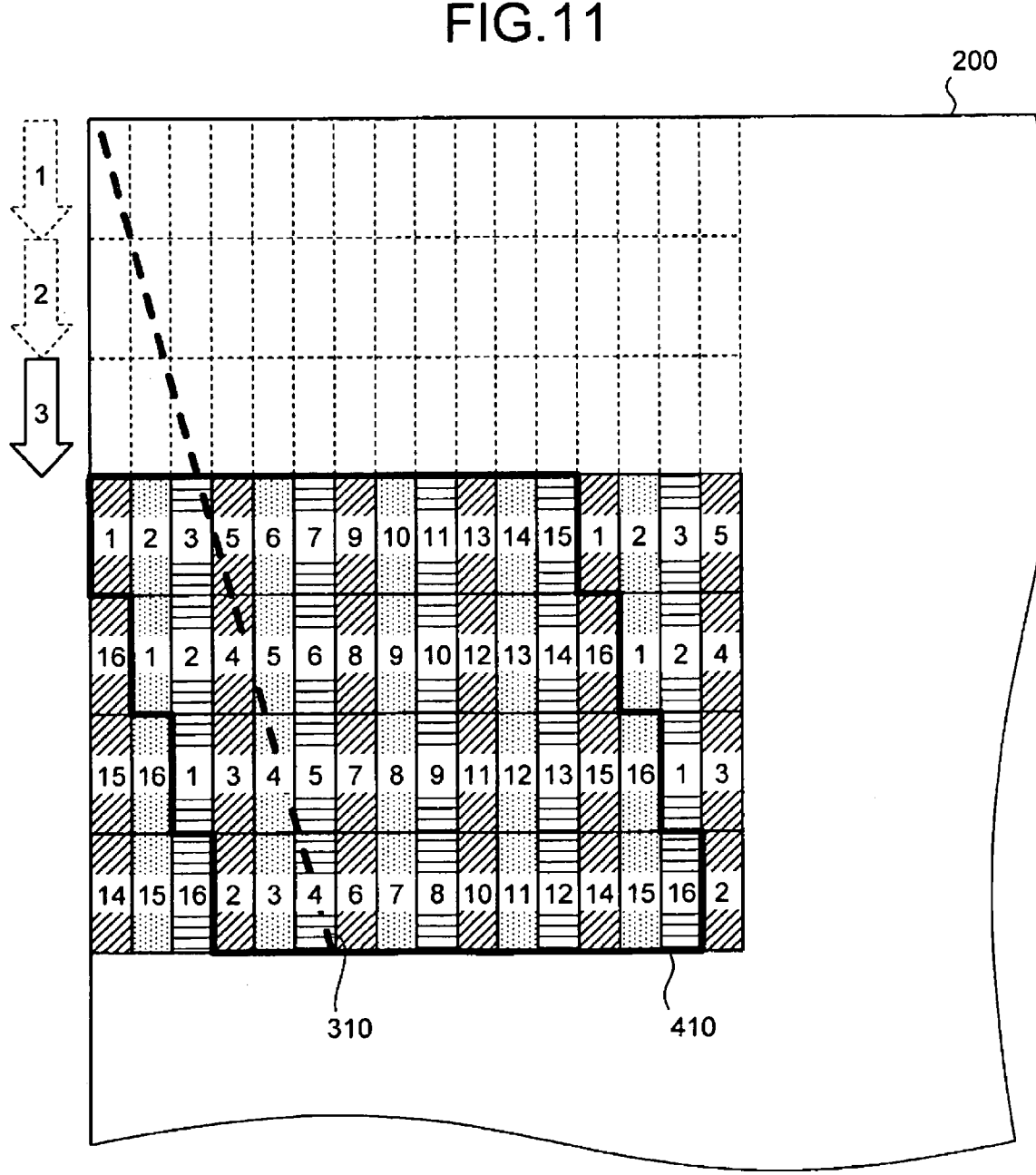
FIG. 11 shows a result of shifting of the elemental image array by three pixels.
Figure 12:
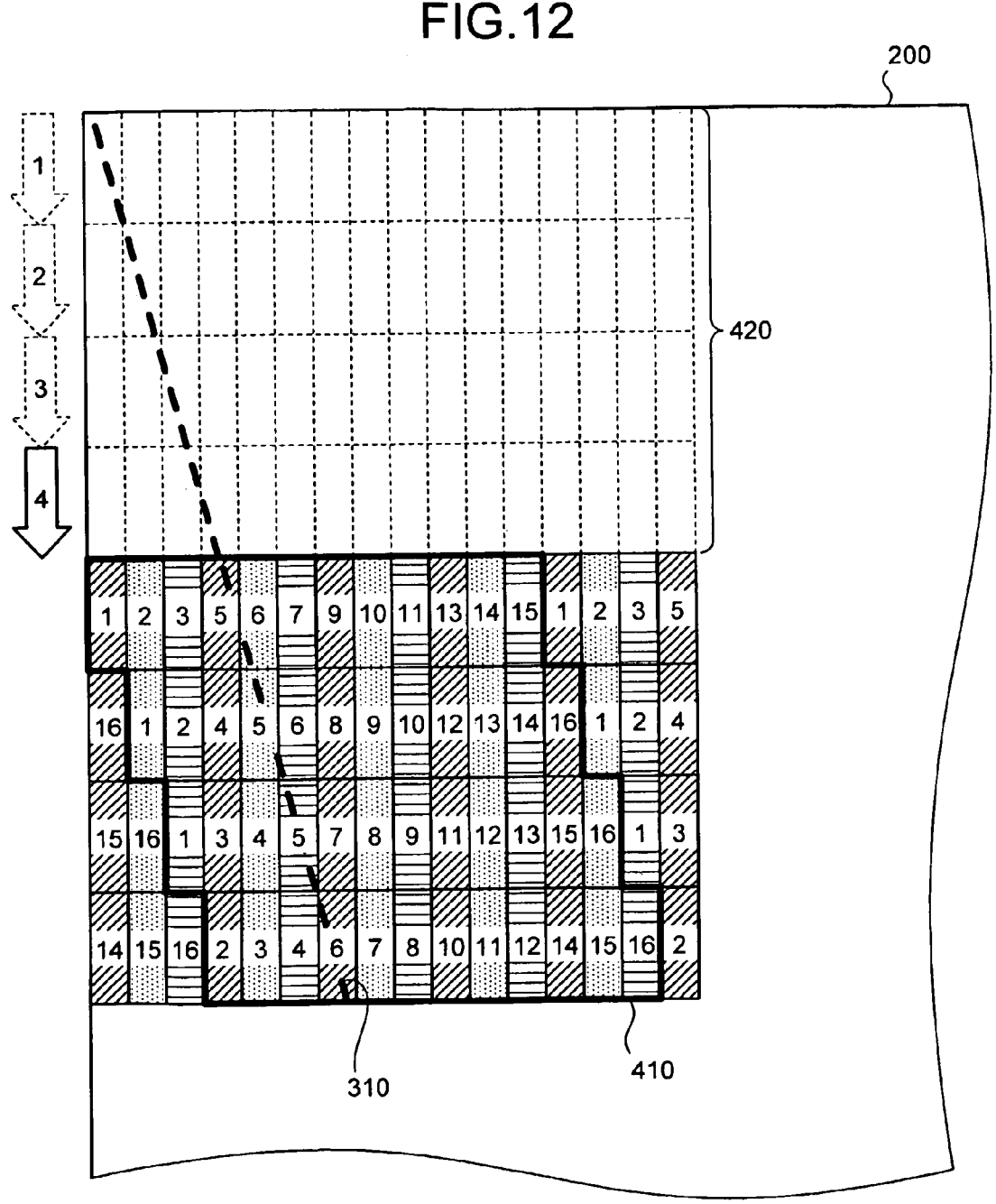
FIG. 12 shows a result of shifting of the elemental image array by four pixels.

FIG. 11 shows a result of shifting of the elemental image array by three pixels. FIG. 12 shows a result of shifting of the elemental image array by four pixels. As is found by comparing FIGS. 11 and 8, the parallax informations disposed on the inclined line 312 after the elemental image array is shifted by four pixels in the vertical direction, and the parallax informations disposed on the inclined line 312 after the array is shifted by one pixel in the horizontal direction are both the fifth parallax informations.

In this manner, the shift by four pixels in the vertical direction corresponds to the shift by one pixel in the horizontal direction. In other words, the shift by a quarter pixel in the horizontal direction is realized by the shift by one pixel in the vertical direction.

For example, as described above, when the elemental image array is shifted by one pixel in the horizontal direction, the visual region is shifted by 51.72 mm. However, when the array is shifted by one pixel in the vertical direction, the viewing zone can be shifted by pitch of 51.72 mm/4 mm. The shift amount of the visual region when the elemental image array is shifted by one pixel in the vertical direction equals to the interval (xp) represented by the formula (10).

Since the number of the pixels of the two-dimensional image display screen 200 is limited, a value of the interval (xp) is finite. The shift of the visual region can be made identical to the interval in which the parallax information is presented (xp=xs) under this condition. In other words, the visual region can be made to follow perfectly smoothly in the system.

As described above, the shift of the viewing zone in the horizontal direction, in which the minimum unit of which is smaller than that in the shift in the vertical direction, is realized with the vertical shift of the elemental image array. Then, the shift direction determining unit 132 determines whether the elemental image array is shifted in the horizontal direction or in the vertical direction, according to the shift amount determined by the shift amount determining unit 130.

When the longitudinal axis 302 is inclined so as to form a downward slope as in the optical plate 300 according to this embodiment, in other words, when the inclination degree θ of the longitudinal axis 302 satisfies −45°<θ<0°, the elemental image array may be shifted downward from top to bottom of the two-dimensional image display screen 200, in order to shift the elemental image array from a right side to a left side of the two-dimensional image display screen 200 seen from an observer side. Further, the elemental image array may be upward shifted from below the two-dimensional image display screen 200, in order to shift the elemental image array from the left side to the right side.

Further as another example, when the longitudinal axis 302 of the optical plate 300 slopes down to left, in other words, when the inclination degree θ of the longitudinal axis 302 satisfies 0°<θ<45°, the elemental image array may be shifted upward from the bottom to the top, in order to shift the elemental image array from right side to left side. In order to shift the elemental image array from the left side to the right side, the elemental image array may be shifted from the top to the bottom.

Meanwhile, along with the shift of the elemental image array, the three-dimensional image itself is shifted upwards or downwards. However, since the shift amount is product of pixel pitch and shift amount, shift of the three-dimensional image in the vertical direction is as small as 517.5 μm (=xsp× 3×3), for example, even when the elemental image array is shifted by three pixels as shown in FIG. 11, and hence, the vertical shift of the three-dimensional image does not become problematic.

When the shift amount is equal to or larger than this, the shift in the vertical direction may be increased. Alternatively, the shift in the horizontal direction may be combined. The shift by one pixel in the horizontal direction equals to the shift by four pixels in the vertical direction. Hence, when the shift amount is equal to or larger than one pixel in the horizontal direction, the shift in the horizontal direction is combined. Thereby, it becomes possible to narrow a surplus portion generated by the shift of the elemental image array. Herein, the surplus portion is intended to mean the pixel region to which the parallax information is not assigned as a result of the shift of the elemental image array. For example, in FIG. 12, a region 420 is the surplus portion.

Further, by combining the shifts in the horizontal direction and in the vertical direction in this manner, it becomes possible to minimize the displacement of the display position of the three-dimensional image caused by the shift of the elemental image array.

FIG. 4 is described again. The elemental image array shifting unit 134 shifts the elemental image array by the shift amount determined by the shift amount determining unit 130 in the shift direction determined by the shift direction determining unit 132. The surplus portion processing unit 140 assigns an appropriate image to the surplus portion generated after shifting by the elemental image array shifting unit 134. Specifically, the elemental image array disposed before the shifting is assigned.

Alternatively, an image to be assigned to the surplus portion may be held in advance and assigned. A black image, for example, may be used as such an image.

As described above, the parallax information is the information, the size of which is larger than the screen size of the two-dimensional image display screen 200. In order to minimize the surplus portion generated at the shifting of the elemental image array, the information, the size of which is larger than the screen size of the two-dimensional image display screen 200, is generated. In this manner, since the size of the parallax information is larger than the screen size of the two-dimensional image display screen 200, the surplus portion may be minimized, and the three-dimensional image can be displayed with accuracy even when the elemental image array is shifted.

Figure 13:
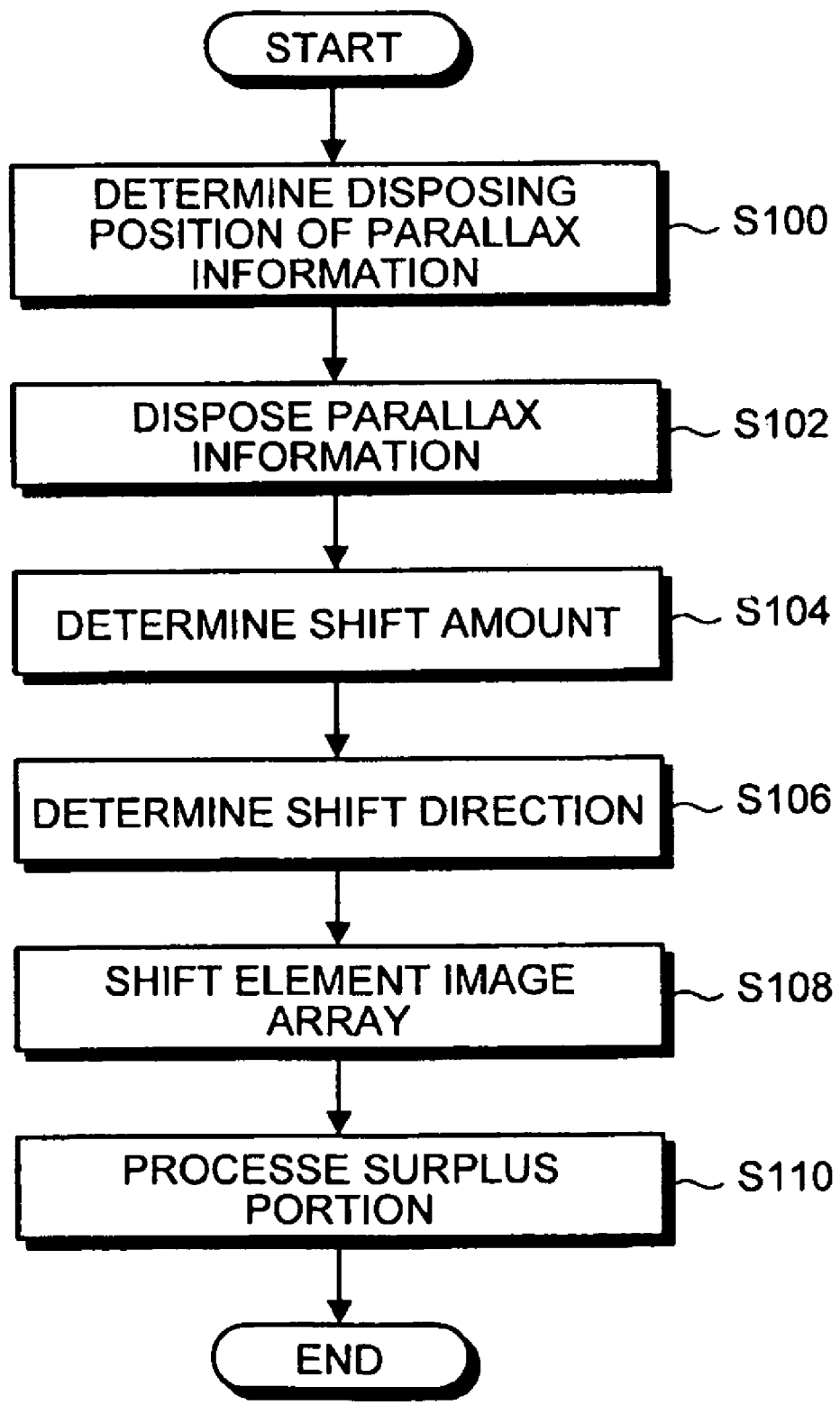
FIG. 13 is a flowchart showing a position displacement correction process by the three-dimensional image display device according to the first embodiment.

FIG. 13 is a flowchart of a position displacement correction process by the three-dimensional image display device 10 according to the first embodiment. The parallax information disposing unit 110 determines a disposing position of the parallax information based on the device information held by the device information holding unit 104 (step S100). Next, the parallax information disposing unit 110 disposes the parallax information held by the parallax information holding unit 102 on the determined disposing position (step S102).

Next, the shift amount determining unit 130 determines the shift amount based on the viewing position displacement amount detected by the viewing position displacement detecting unit 120 and the adjustment value held by the adjustment information holding unit 122 (step S104). Then, the shift direction determining unit 132 determines the shift direction based on the shift amount determined by the device information holding unit 104 (step S106). Further, the elemental image array shifting unit 134 shifts the elemental image array (step S108). Further, the parallax information disposing unit 110 assigns an appropriate image to the surplus portion generated by the shift (step S110). Herewith, the position displacement correction process ends.

The above-described position displacement correction process may be performed at the fabrication of the three-dimensional image display device 10, or after the shipment of the same by instruction of the user.

First, a correction process of the viewing position displacement is described. When the observer moves to the y-direction, it is possible to make the viewing zone move to the position where the observer moves, by making the viewing zone shift in the x-direction.

Figure 14:
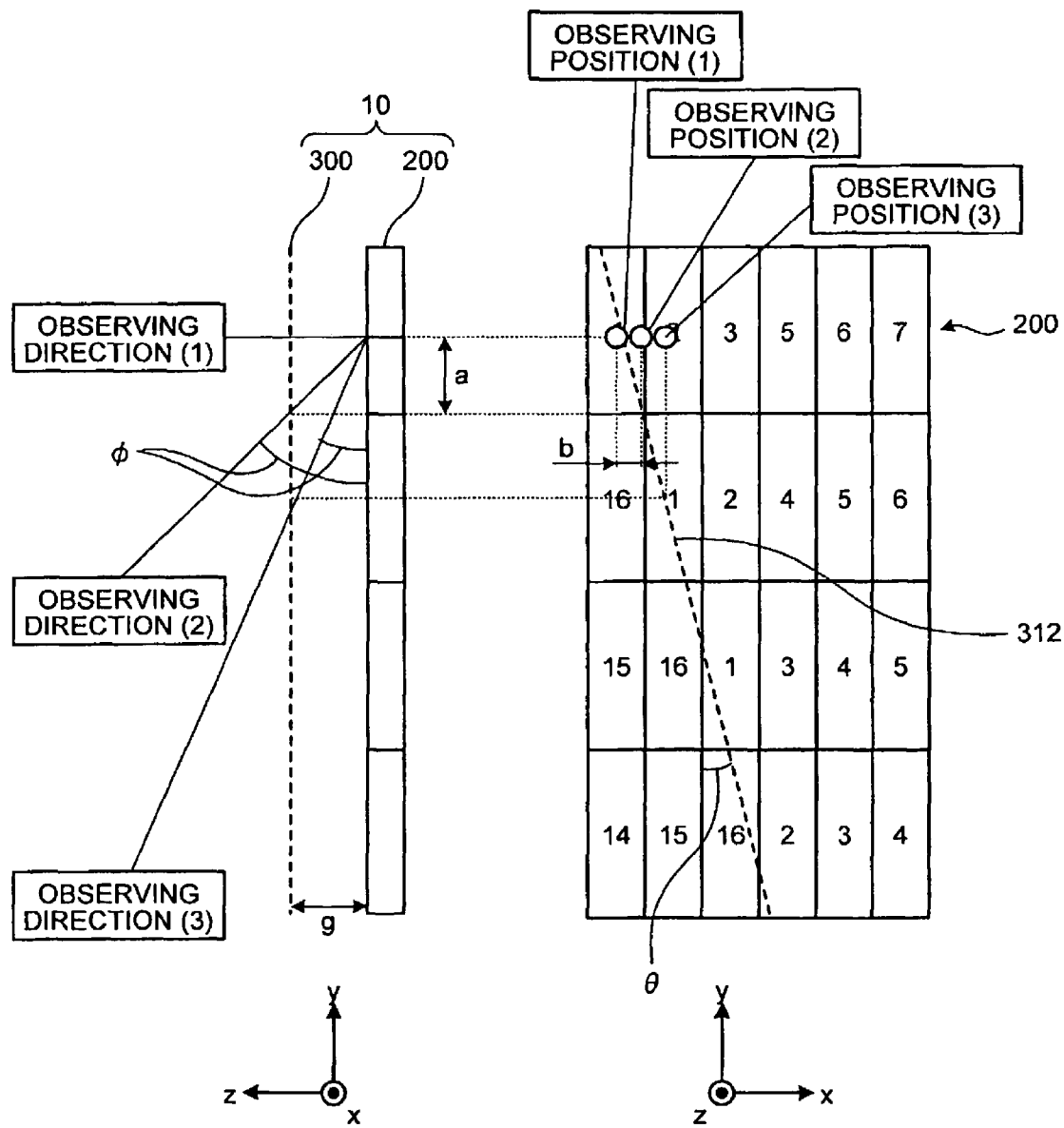
FIG. 14 schematically shows a shift of the viewing zone according to a movement of the observer in y-direction.

FIG. 14 illustrates the shift of the viewing zone in accordance with the move of the observer in the y-direction. As shown in FIG. 14, when the observer observes the three-dimensional image in an observing direction (1), that is, the z-direction, which is a normal line direction of the two-dimensional image display screen 200, the pixels on a viewing position (1) are observed. If the observing direction moves to directions (2) and (3), the viewing positions are accordingly shifted to positions (2) and (3), respectively.

Thus, when the y coordinate of the observer shifts, the position of the parallax information relative to the exit pupil, or the position of the exit pupil relative to the parallax information relatively moves in the x-direction. In other words, when the observer moves to the y-direction, the viewing zone is shifted to the x-direction.

The shift of the viewing zone along with the move of the observer in the y-direction is especially noticeable when a horizontal parallax type three-dimensional image display device is set such that a display surface thereof is horizontal, i.e., when the device is used as a flatbed display device.

Figure 15:
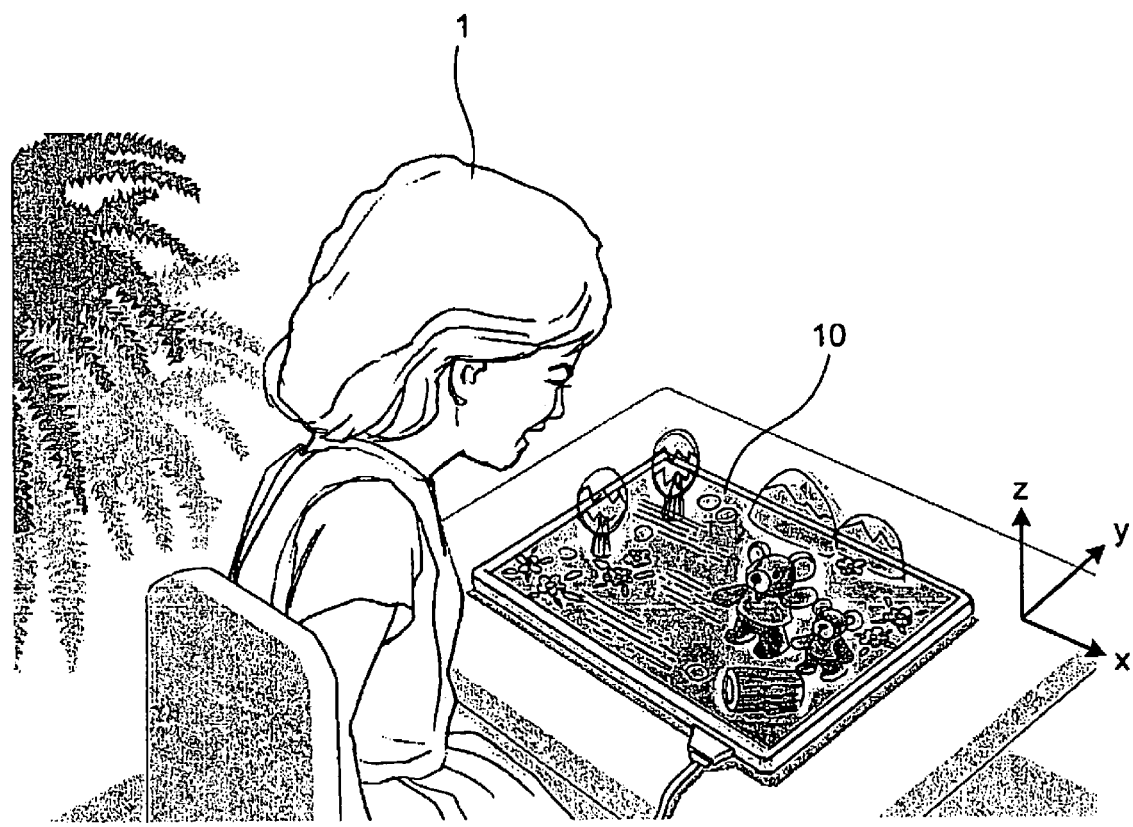
FIG. 15 shows a flatbed-type three-dimensional image display device.

FIG. 15 shows a three-dimensional image display device 10 of a flatbed type. As shown in the drawing, in the case of the flatbed-type three-dimensional image display device 10, the observer looks down the screen of the three-dimensional image display device 10 from above. Hence, the y coordinate of the viewing position is affected by the position and the sitting height of the observer. Therefore, the viewing position easily varies as compared to that of the vertically set display device.

The three-dimensional image display device 10 according to the first embodiment can deal with such variation in the viewing position with high accuracy.

This will be described more specifically. When the viewing position moves in the y-direction (displacement amount: y1), the shift amount xs of the viewing zone in the horizontal direction is represented by a formula (12):

$$xs = b \times L/g \quad (12)$$

Herein, b is a value of a horizontal displacement width in a single pixel row of the two-dimensional image display device observed through a single exit pupil when the viewing position moves in the y-direction, and is represented by a formula (13):

$$b = a \times \tan\theta \quad (13)$$

Further, "a" represents an interval width between a slit position and the viewing position, and is represented by a formula (14):

$$a = g/\tan\phi \quad (14)$$

Herein, tan φ is defined by a following formula (15):

$$\tan\phi = L/y1 \quad (15)$$

Thus, the formula (12) is transformed as a formula (16):

$$xs = b \times L/g = (g/\tan\phi) \times \tan\phi \times L/g = \tan\theta \times L/\tan\phi \quad (16)$$

Therefore, if the above-described horizontal parallax type three-dimensional image display device is horizontally set as a flatbed display and observed with angle of depression of 45°, the viewing zone is shifted no less than 100 mm in the horizontal direction as compared to a case where the device is observed from front (with angle of depression of 90°).

If the parallax number is set to N (N=16, in the first embodiment), the viewing zone (VW) is represented by a formula (17):

$$VW = N \times 3/4 \times xsp \times L/g \quad (17)$$

Therefore, under the condition of the first embodiment, VW=206.89 mm. Further, the interval (xp) in which the parallax information is presented is 12.93 mm as described above.

So, if the viewing zone is shifted by 100 mm, this is equivalent that the viewing zone is shifted approximately halfway. In other words, if the image, which is set on the assumption that the angle of depression is 45°, is observed from right above the display by the observer who leans over the display, the position of the head of the observer is on the edge of the visual region.

Further, if the y coordinate of the observer (L=400 mm) moves as short as 4 cm, the viewing zone is shifted by 10 mm, i.e., approximately one parallax in the horizontal direction. This indicates that positioning of the lens while assuming the angle of depression is difficult.

The three-dimensional image display device 10 according to the first embodiment can solve the above-described problem. As already described, the three-dimensional image display device 10 according to the first embodiment can shift the viewing zone with a minimum unit of 12.93 mm.

Therefore, if the observer moves from the position with the angle of depression of 45° to the position with the angle of depression of 90°, the viewing zone may be shifted by one to eight pixels in the vertical direction, in accordance with the move. Further, when the region is shifted by four pixels or more, the shift in the horizontal direction can be combined.

The positioning of the two-dimensional image display screen 200 and the optical plate 300 is performed in the fabricating process. When the optical plate 300 is attached to the two-dimensional image display screen 200, displacement of an attaching position, that is, the displacement of the optical plate becomes problematic. The alignment of the two-dimensional image display screen 200 and the optical plate 300 affects the viewing zone of the three-dimensional image display device 10, and hence sufficient accuracy is required.

In the horizontal parallax system, there is a case where the parallax information is disposed by sub-pixel pitch of a FPD, in order to increase the horizontal parallax number. In this case, the parallax information is shifted by one with a shift by the sub-pixel width (approximately 50 μm). If the exit pupil is inclined from the vertical direction, it is required to assume the angle of depression, that is, the y coordinate, when setting the viewing zone, which makes the positioning even more difficult.

The three-dimensional image display device 10 can correct the viewing zone according to such displacement of the optical plate 300. Specifically, if the user inputs such an optical plate displacement amount, the adjustment information obtaining unit 124 obtains the optical plate displacement amount as the adjustment information, and holds the same. Further, the three-dimensional image display device 10 shifts the elemental image array according to the optical plate displacement amount, and sets a disposing position after the shift as a default value. Thereby, the displacement of the optical plate 300 can be compensated. In brief, yield ratio can be improved by recovery.

Further, in the fabricating process, the optical plate 300 is attached by observing from a normal line direction of the two-dimensional image display screen 200, and after that, the angle of depression (φ) is measured. Further by an input of the angle of depression by the user, the adjustment information holding unit 122 obtains the angle of depression input by the user through the adjustment information obtaining unit 124, and holds the same. The elemental image 410 may be shifted according to the held angle of depression, and the disposing position after the shift may be set as the default value. Thereby, a device can be manufactured irrespective of type of usage.

Further, there is a case where the user wants to use the three-dimensional image display device 10 in both vertical and horizontal setting. In this case, the three-dimensional image display device 10 can correct the visual region according to the displacement amount generated from the inclination degree of the three-dimensional image display device 10 itself. Specifically, the inclination degree of the three-dimensional image display device 10 is obtained by the input of the user. Further, by shifting the elemental image 410 according to the setting degree, an appropriate three-dimensional image can be displayed for each type of usage.

Further, there is a case where the optical plate displacement is generated according to the change over time after fabrication. For example, such displacement could be generated by an environment or a physical shock after the shipment. In this case, the three-dimensional image display device 10 can adjust the disposing position according to the optical plate displacement amount.

Figure 16:
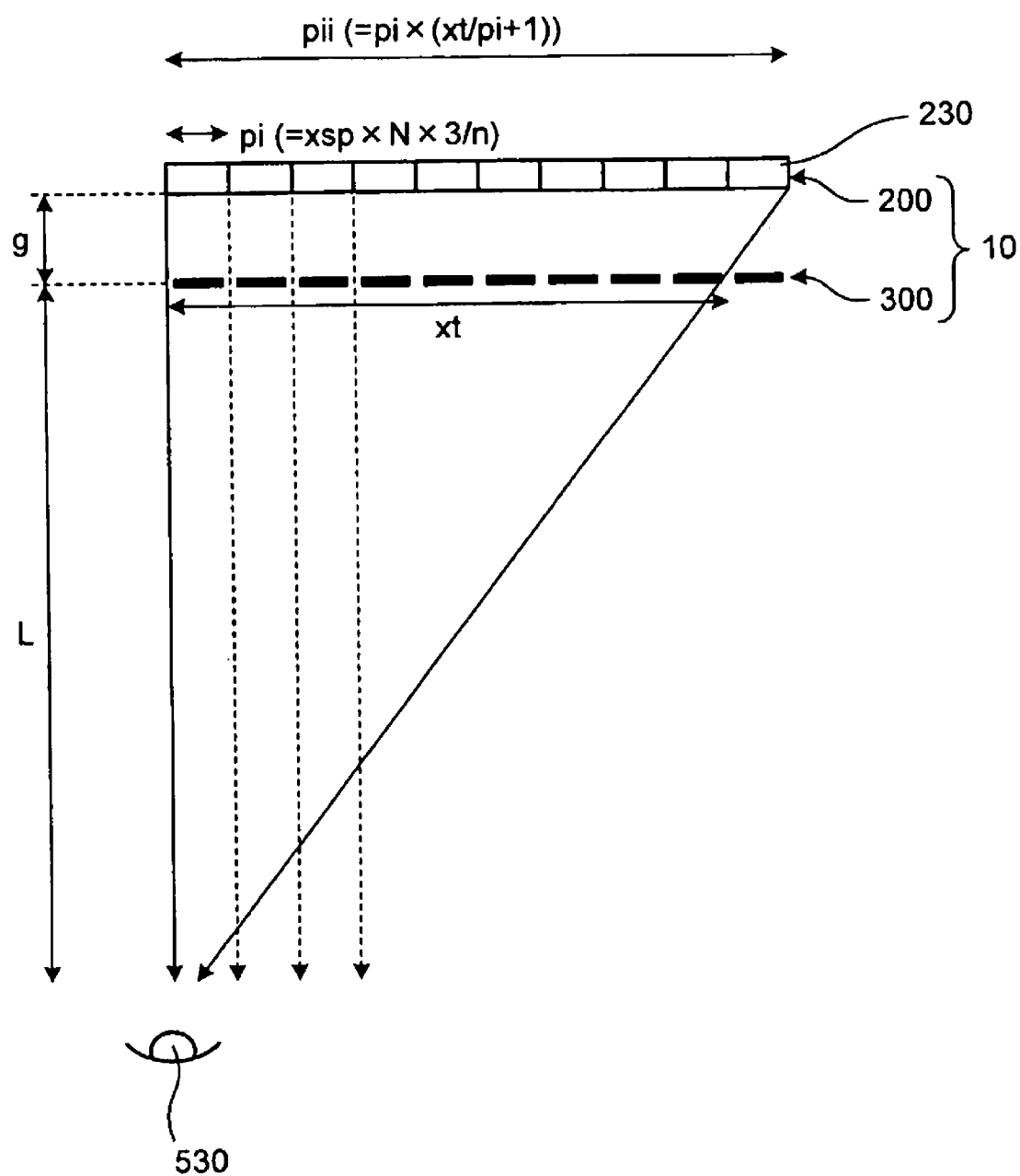
FIG. 16 is a diagram for explaining the position displacement correction process in an integral imaging system.

The three-dimensional image display device 10 holds an image for adjustment, which is used at the correction of such optical plate displacement, to perform a displacement correction process using this image. Hereinbelow, a case with an integral imaging system will be described. FIG. 16 illustrates the displacement correction process in the integral imaging system.

When horizontal pitch of the exit pupil is set to integral multiple of the sub-pixel pitch, rays which exit from the pixels having the same parallax number (camera number) are in a substantially parallel relationship, as shown in FIG. 16.

For example, suppose that only the sub-pixels, on which the first parallax information is disposed in FIG. 5, are illuminated and others are not illuminated. When the display is observed in this state from a viewing position 530 away from the display by a distance L, with one eye, emission lines extending in the vertical direction with constant intervals, are observed.

If the interval is set to xt, a horizontal interval between the pixels on which the first parallax information is disposed is set to pi, and an interval between the pixels on which the first parallax information simultaneously seen by one eye is disposed is set to pii, formulae (18) to (20) are obtained:

$$pi = xsp \times N \times 3/n \quad (18)$$

$$pii = pi \times (xt/pi + 1) \quad (19)$$

$$pii = (L+g)/L \times xt \quad (20)$$

By assigning the previously described formulae into the formulae (18) to (20), a formula (21) can be obtained:

$$xt = pii - pi = 3 \times xsp \times N/n/((L+g)/L - 1) \quad (21)$$

When the previously described conditions are assigned into the formula (21), xt=206.9 mm. That is, the emission lines are visually recognized as vertical stripes with intervals of approximately slightly above 20 cm. The display positions of the emission lines are uniquely determined according to the relation between the illuminated parallax information and the position of the optical plate 300. Therefore, by making the image for adjustment and the display position (x coordinate) of the emission line correspond to each other, it becomes possible to confirm the optical plate displacement by visually recognizing the position displacement and the inclination of the emission lines.

For example, if the optical plate position is shifted by one sub-pixel in the x-direction, the position of the emission line is shifted by xs represented by a formula (22):

$$xs = xsp \times L/g \tag{22}$$

When the elemental image 410 is disposed as shown in FIG. 5, when the emission line is shifted by xf in the x-direction, the elemental image array may be shifted downward by (xf/xs) rows.

When mounting the same, for example, a key to sequentially shift the elemental image array upward or downward (horizontally), in a condition in which the user is on the viewing position, is provided, and makes the user adjust by pressing the key until the emission lines have desired intervals.

An ideal display position of the emission lines may be presented by a document or the like, or presented in some way outside the display region for the three-dimensional image (for example, a casing) of the three-dimensional image display device.

Furthermore, the elemental image array including an image for positioning can be prepared by dividing the elemental image array in two portions in the vertical direction. An image for adjustment (A) is displayed on one of the two portions. Further, a guide image (B) indicating the x coordinate on which the emission lines should be displayed is displayed on the other portion. The guide image may be in a condition in which all the elemental images corresponding to the exit pupils relevant to the x coordinate on which the emission lines are to be indicated, are illuminated.

When all the corresponding elemental images are illuminated, the elemental images in a certain range (=viewing zone) are sequentially seen illuminated. Therefore, even if the position of the exit pupil is shifted a little, if this is not shifted halfway the elemental image width or more, these elemental images are always seen illuminated, when this is observed by one eye in the viewing zone. In such a condition, an entire image (A+B) including the elemental image array is shifted up and down, and to the right and the left, thereby making the x coordinate of the lens which illuminates in a (B) range and the x coordinate of the lens which illuminates in a (A) range substantially conform to each other.

Figure 17:
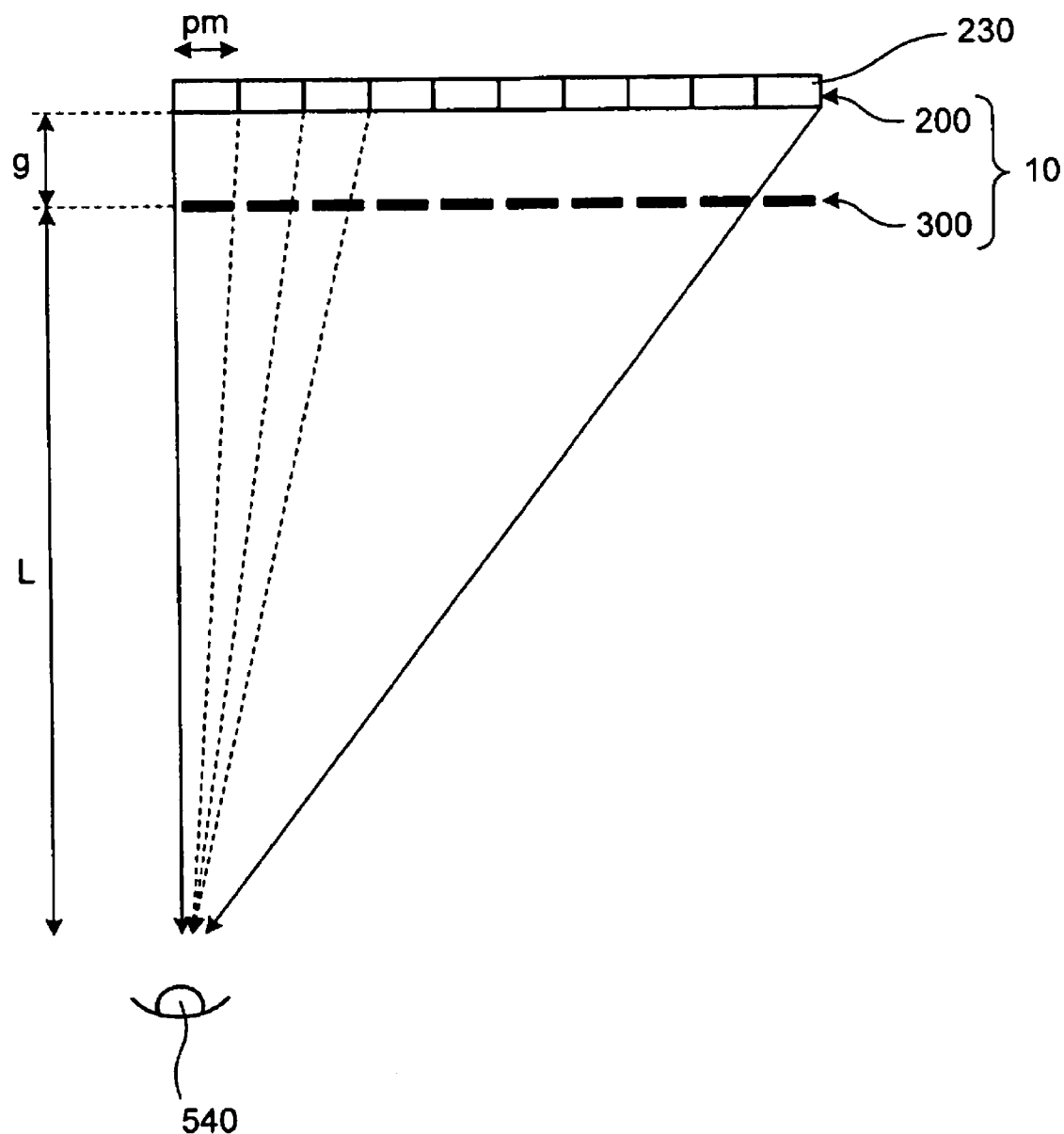
FIG. 17 is a diagram for explaining the position displacement correction process in a multi-lens type system.

Next, a case of multi lens system is described. FIG. 17 illustrates a position displacement correction process in a multi lens system. Horizontal pitch of the exit pupil of the multi lens system is set to L/(L+g), which is an integral multiple of the sub-pixel pitch. Consequently, as shown in FIG. 17, rays exit from the pixels on which the identical parallax information is disposed are focused on a position 540 with a visual distance L.

For example, suppose that only the sub-pixels on which the first parallax information is disposed, which are disposed as shown in FIG. 5 are illuminated and others are not illuminated. In this case, if the image is observed by one eye from the distance L, the image is observed such that the entire image is illuminated. However, if this is observed from a point off from a designed visual distance L, a range of illuminated pixels is narrowed (only the pixels directly in front of the observer are seen illuminated). In other words, when the image is observed from a position slightly off from the visual distance L, the inclination of the optical plate 300 can be confirmed. For example, if the optical plate 300 is attached to the two-dimensional image display screen 200 as to be inclined relative to the two-dimensional image display screen 200, the illuminated region observed from a position off from the visual distance L is also inclined. Further, when an attaching position of the optical plate 300 is shifted in the x-direction, the entire image is seen not illuminated.

Therefore, when the user is made to operate the key to shift the elemental image array in up-and-down (horizontal) direction to illuminate the entire image, displacement of the lens position may be compensated by up-and-down (vertical) shift of the elemental image array.

Figure 18:
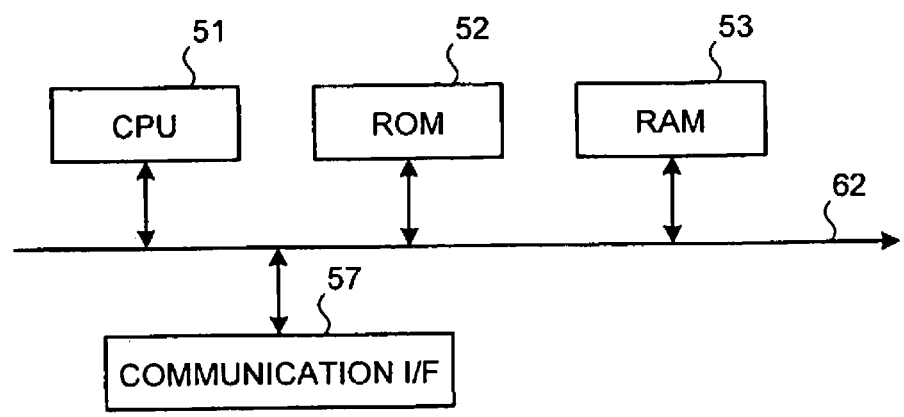
FIG. 18 is a diagram of a hardware structure of the display image processing unit of the three-dimensional image display device according to the first embodiment.

FIG. 18 is a block diagram of a hardware structure of the display image processing unit 100. The display image processing unit 100 is provided with a read only memory (ROM) 52 that stores the displacement correction program for executing the displacement correction process in the three-dimensional image display device 10, or the like, a central processing unit (CPU) 51 that controls each unit of the three-dimensional image display device 10 according to the program in the ROM 52, a random access memory (RAM) 53 that stores various data required for controlling the three-dimensional image display device 10, a communication interface (I/F) 57 that communicates by connecting to a network, and a bus 62 that connects respective units with each other, as the hardware structure.

The above-described displacement correction program in the display image processing unit 100 may be stored in a computer-readable recording medium, such as a compact disc read only memory (CD-ROM), a Floppy (Registered trademark) Disk (FD), a digital versatile disk (DVD) or the like, as an installable or an executable file, and provided.

In this case, the displacement correction program is read out from the above-described recording medium and executed by the display image processing unit 100 to be loaded on a main memory, and each of the units explained in the above-described software structure is generated on the main memory.

Further, the displacement correction program of the first embodiment may be configured to be stored on the computer connected to a network such as the Internet or the like, and to be provided by being downloaded through the network.

While the present invention has been explained in connection with the embodiment, various modifications and improvements can be made to the above-described embodiment.

Figure 19:
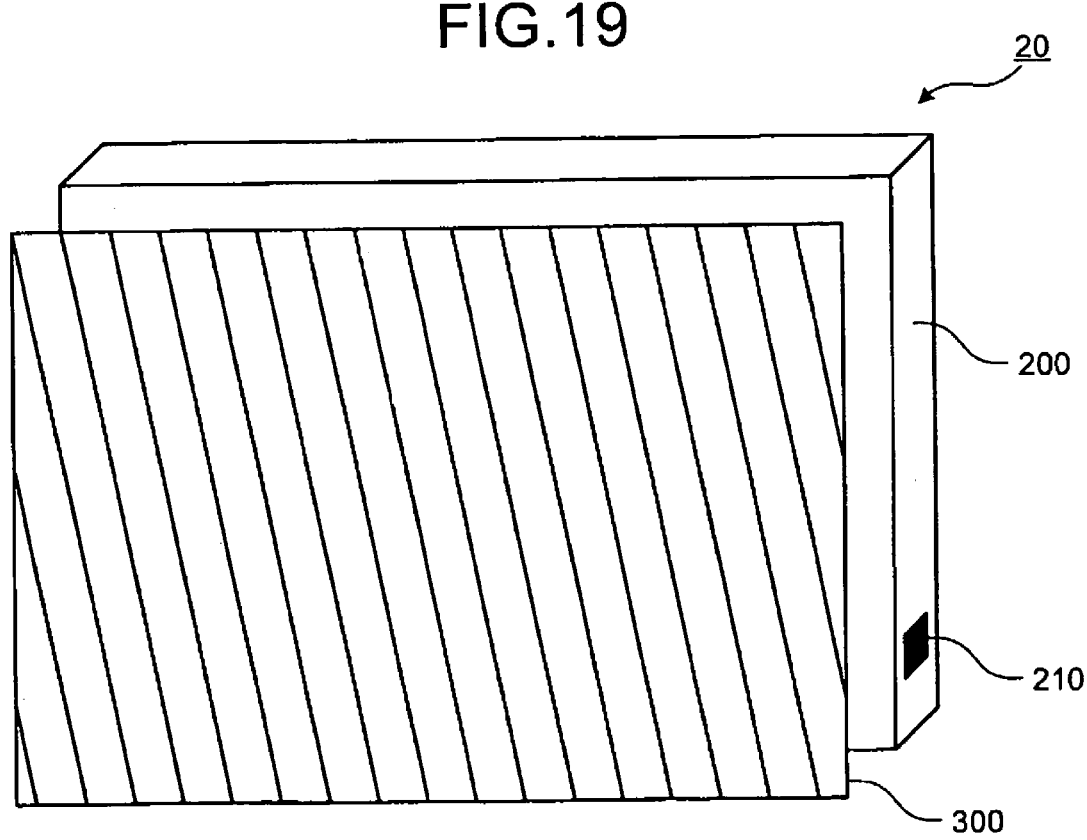
FIG. 19 is a view showing a three-dimensional image display device according to a second embodiment.

FIG. 19 is a view showing a three-dimensional image display device 20 according to a second embodiment. A three-dimensional image display device 20 according to the second embodiment is a portable type. The three-dimensional image display device 10 according to the second embodiment includes an inclination detecting unit 210.

As a usage pattern of the portable type three-dimensional image display device 20, it is envisaged that the user holds the same in his/her hand and observes the three-dimensional image displayed on the three-dimensional image display device 20. In this case, the viewing zone is shifted according to a relative angle between the three-dimensional image display device 20 and the viewing position.

When the user holds the three-dimensional image display device 20 in his/her hand, the relative angle may continually vary. Then, in addition to detection of the viewing position of the user, an inclination of the three-dimensional image display device 20 itself is detected. Further, according to the result of detection, a relative position displacement and a degree of the displacement of the observer relative to the two-dimensional image display screen 200 is detected.

Other structure and process of the three-dimensional image display device 20 according to the second embodiment are similar to those of the three-dimensional image display device 10 according to the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A three-dimensional image display device comprising:
a two-dimensional image display screen having color filters in which each color is disposed on sub-pixels obtained by dividing one pixel in a vertical direction and same color is disposed on each column of sub-pixels;
an optical plate having an exit pupil, the exit pupil being provided for making a viewing zone different for each pixel and having a longitudinal axis disposed to be inclined from a vertical direction of the two-dimensional image display screen at a non-zero angle between −45° and 45°, the viewing zone being a region in which parallax information displayed on the two-dimensional image display screen is observed, the parallax information being presented in a horizontal direction of the two-dimensional image display screen;
a viewing position displacement detecting unit that detects a viewing position displacement amount in the vertical direction of the two-dimensional image display screen, the viewing position displacement amount being a displacement amount between a viewing position on which a three-dimensional image displayed on the three-dimensional image display device is to be observed and an actual position of an observer;
a viewing zone shift amount determining unit that determines a shift amount of the parallax information in the vertical direction based on the viewing position displacement amount; and
a viewing zone adjusting unit that shifts the parallax information disposed on each pixel of the two-dimensional image display screen in the vertical direction by the shift amount.

2. The three-dimensional image display device according to claim 1, further comprising:
the viewing position holding unit that holds the viewing position, wherein
the viewing position displacement detecting unit recognizes a position of the observer by image recognition, and detects a difference value between the recognized position of the observer and the viewing position held by the viewing position holding unit as the viewing position displacement amount.

3. The three-dimensional image display device according to claim 1, further comprising a surplus portion processing unit that disposes the parallax information on a pixel, which is located on the two-dimensional display screen and on which the parallax information is not disposed after the shift of the parallax information.

4. The three-dimensional image display device according to claim 1, further comprising a surplus portion processing unit that disposes a black image on a pixel, which is located on the two-dimensional display screen and on which the parallax information is not disposed after the shift of the parallax information.

5. The three-dimensional image display device according to claim 1, further comprising:
a parallax information holding unit that holds the parallax information, a size of which is larger than a size of the two-dimensional image display screen, wherein
the two-dimensional image display screen displays the parallax information held by the parallax information holding unit.

6. The three-dimensional image display device according to claim 5, further comprising
a parallax information preparing unit that prepares the parallax information, the size of which is larger than the size of the two-dimensional image display screen, wherein
the parallax information holding unit holds the parallax information prepared by the parallax information preparing unit.

7. A method of displaying a three-dimensional image comprising:
in a three-dimensional image display device including
a two-dimensional image display screen having color filters in which each color is disposed on sub-pixels obtained by dividing one pixel in a vertical direction and same color is disposed on each column of sub-pixels, and
an optical plate having an exit pupil, the exit pupil being provided for making a viewing zone different for each pixel and having a longitudinal axis disposed to be inclined from a vertical direction of the two-dimensional image display screen at a non-zero angle between −45° and 45°, the viewing zone being a region in which parallax information displayed on the two-dimensional image display screen is observed, the parallax information being presented in a horizontal direction of the two-dimensional image display screen,
detecting a viewing position displacement amount in the vertical direction of the two-dimensional image display screen, the viewing position displacement amount being a displacement amount between a viewing position on which a three-dimensional image displayed on the three-dimensional image display device is to be observed and an actual position of an observer;
determining a shift amount of the parallax information in the vertical direction based on the viewing position displacement amount; and
shifting the parallax information disposed on each pixel of the two-dimensional image display screen in the vertical direction by the shift amount.

8. A computer program product having a non-transitory computer readable medium including programmed instructions, wherein the instructions, when executed by a computer, cause the computer to perform:
in a three-dimensional image display device including
a two-dimensional image display screen having color filters in which each color is disposed on sub-pixels obtained by dividing one pixel in a vertical direction and same color is disposed on each column of sub-pixels, and
an optical plate having an exit pupil, the exit pupil being provided for making a viewing zone different for each pixel and having a longitudinal axis disposed to be inclined from a vertical direction of the two-dimensional image display screen at a non-zero angle between −45° and 45°, the viewing zone being a region in which parallax information displayed on the two-dimensional image display screen is observed, the parallax information being presented in a horizontal direction of the two-dimensional image display screen, detecting a viewing position displacement amount in the vertical direction of the two-dimensional image display screen, the viewing position displacement amount being a displacement amount between a viewing position on which a three-dimensional image displayed on the three-dimensional image display device is to be observed and an actual position of an observer;

determining a shift amount of the parallax information in the vertical direction based on the viewing position displacement amount; and shifting the parallax information disposed on each pixel of the two-dimensional image display screen in the vertical direction by the shift amount.

* * * * *